(12) United States Patent
Esterly

(10) Patent No.: US 10,402,470 B2
(45) Date of Patent: Sep. 3, 2019

(54) EFFECTING MULTI-STEP OPERATIONS IN AN APPLICATION IN RESPONSE TO DIRECT MANIPULATION OF A SELECTED OBJECT

(71) Applicant: MICROSOFT TECHNOLOGY LICENSING, LLC, Redmond, WA (US)

(72) Inventor: Jonathan D. Esterly, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 15/166,555

(22) Filed: May 27, 2016

(65) Prior Publication Data

US 2017/0235706 A1    Aug. 17, 2017

Related U.S. Application Data

(60) Provisional application No. 62/294,963, filed on Feb. 12, 2016.

(51) Int. Cl.
*G06F 3/048* (2013.01)
*G06F 3/0481* (2013.01)
(Continued)

(52) U.S. Cl.
CPC ............ *G06F 17/212* (2013.01); *G06F 3/048* (2013.01); *G06F 3/0481* (2013.01); *G06F 3/0484* (2013.01)

(58) Field of Classification Search
CPC ... G06F 17/211; G06F 3/0481; G06F 3/04845
See application file for complete search history.

(56) References Cited

U.S. PATENT DOCUMENTS 7,164,410 B2 *  1/2007  Kupka ................. G06F 3/0231
                                                  345/156
7,370,284 B2    5/2008  Andrea et al.
(Continued)

OTHER PUBLICATIONS

Kost, Julieanne, "Lightroom CC—Modifying Book Layouts", Retrieved from <<youtu.be > xF-_tqaCuTo>>, Apr. 21, 2015, 7 Pages.
(Continued)

*Primary Examiner* — Manglesh M Patel
*Assistant Examiner* — Nicholas Hasty
(74) *Attorney, Agent, or Firm* — Talem IP Law, LLP

(57) ABSTRACT

An electronic document having a current layout can be presented in an application user interface. Based on a detected interaction with an object in the electronic document, an intent can be determined. The determined intent can be used to identify different sets of commands that result in corresponding visual representations that are likely to satisfy the determined intent. Different activation regions can be defined within the electronic document. A different command set, each identified from the determined intent, is associated with each different activation region. Movement and release of the selected object to a position within an activation region is detected, and the command set associated with the activation region is executed to perform a multi-step operation that modifies at least the current layout of the electronic document to result in the corresponding visual representation.

20 Claims, 25 Drawing Sheets

(51) Int. Cl.
*G06F 3/0484* (2013.01)
*G06F 17/21* (2006.01)

(56) References Cited

U.S. PATENT DOCUMENTS

| | | | |
|---|---|---|---|
| 8,078,969 B2* | 12/2011 | Harrison | G06F 3/04847 |
| | | | 715/730 |
| 8,290,540 B2 | 10/2012 | Kittel et al. | |
| 8,356,258 B2 | 1/2013 | Matthews et al. | |
| 8,527,907 B2 | 9/2013 | Goshey | |
| 8,793,572 B2* | 7/2014 | Grams | G06T 11/60 |
| | | | 715/243 |
| 9,026,928 B2 | 5/2015 | Ferry et al. | |
| 2008/0282202 A1* | 11/2008 | Sunday | G06F 3/0483 |
| | | | 715/863 |
| 2010/0103124 A1 | 4/2010 | Kruzeniski et al. | |
| 2011/0179345 A1 | 7/2011 | Capela et al. | |
| 2012/0185787 A1 | 7/2012 | Lisse et al. | |
| 2013/0055077 A1 | 2/2013 | Hagel-Sorensen | |
| 2013/0067397 A1 | 3/2013 | Kirschner et al. | |
| 2013/0275904 A1 | 10/2013 | Bhaskaran et al. | |
| 2014/0372923 A1* | 12/2014 | Rossi | G06F 3/0486 |
| | | | 715/769 |
| 2015/0309704 A1 | 10/2015 | Bae et al. | |

OTHER PUBLICATIONS

"International Search Report and Written Opinion Issued in PCT Application No. PCT/US2017/016315", dated Apr. 18, 2017, 14 Pages.

Lok, et al., "Evaluation of Visual Balance for Automated Layout", In Proceedings of the 9th international conference on Intelligent user interfaces, Jan. 13, 2004, 8 pages.

* cited by examiner

Professionally Proving Your Point Using Formatting Tools

Video provides a powerful way to help you prove your point. When you click Online Video, you can paste in the embed code for the video you want to add. You can also type a keyword to search online for the video that best fits your document.

To make your document look professionally produced, Word provides header, footer, cover page, and text box designs that complement each other. For example, you can add a matching cover page, header, and sidebar.

Themes and styles also help keep your document coordinated. When you click Design and choose a new Theme, the pictures, charts, and SmartArt graphics change to match your new theme. When you apply styles, your headings change to match the new theme.

Save time in Word with new buttons that show up where you need them. To change the way a picture fits in your document, click it and a button for layout options appears next to it.

In the new Reading view, you can collapse parts of the document and focus on the text you want.

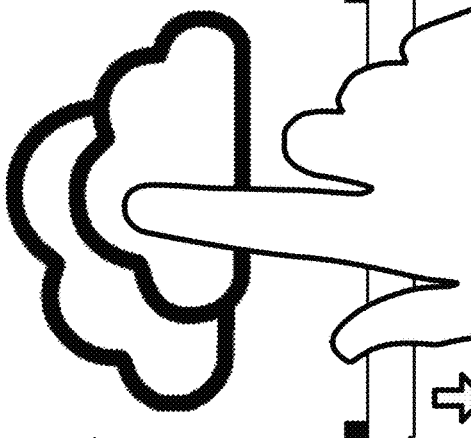

FIG. 2D

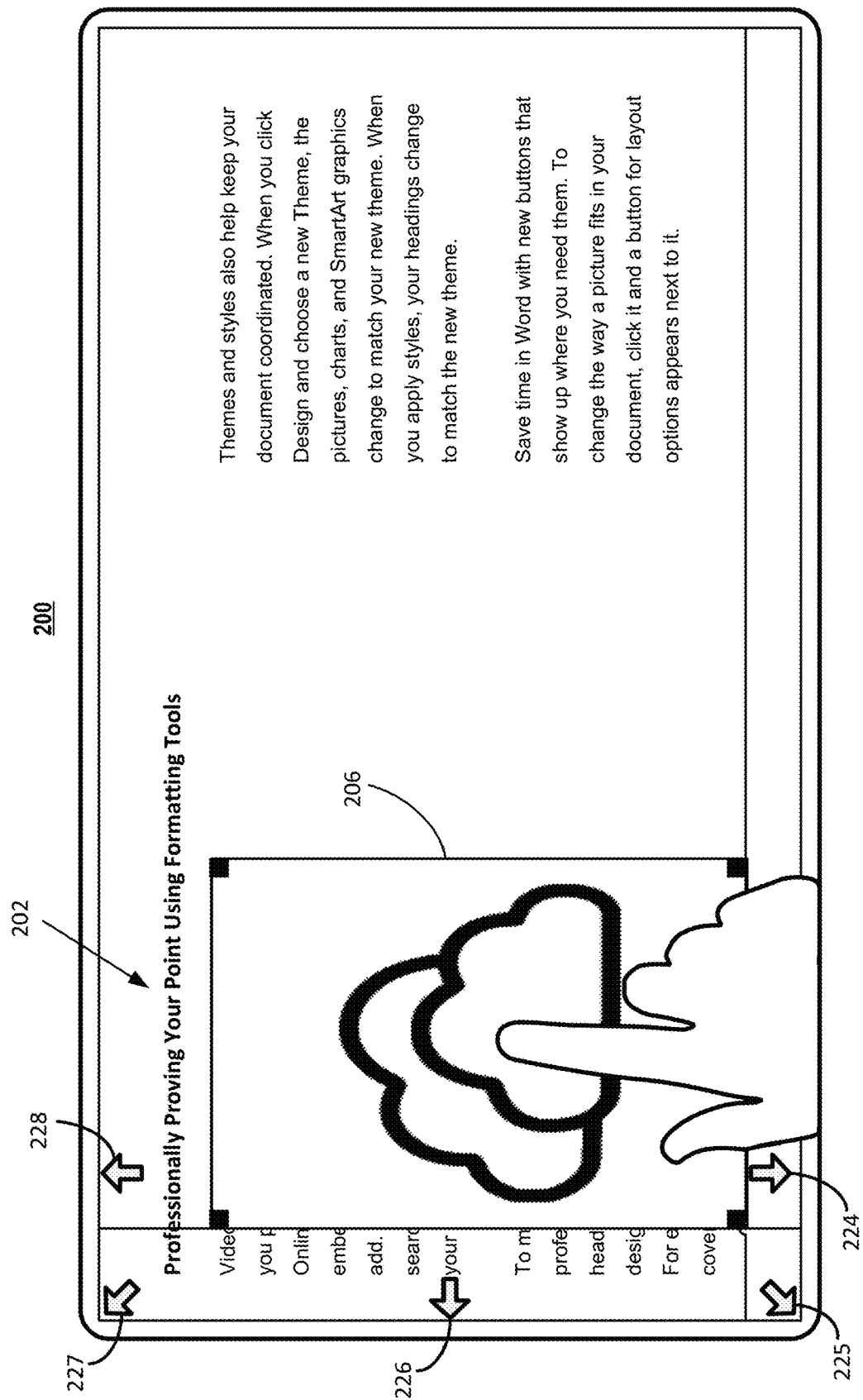

Video provides a powerful way to help you prove your point. When you click Online Video, you can paste in the embed code for the video you want to add. You can also type of keyword to search online for the video that best fits your document.

To make your document look professionally produced, Word provides header, footer, cover page, and text box designs that complement each other. For example, you can add a matching cover page, header, and sidebar.

Themes and styles also help keep your document coordinated. When you click Design and choose a Theme, the pictures, charts, and SmartArt graphics change to match your new theme. When you apply styles, your headings change to match the new theme.

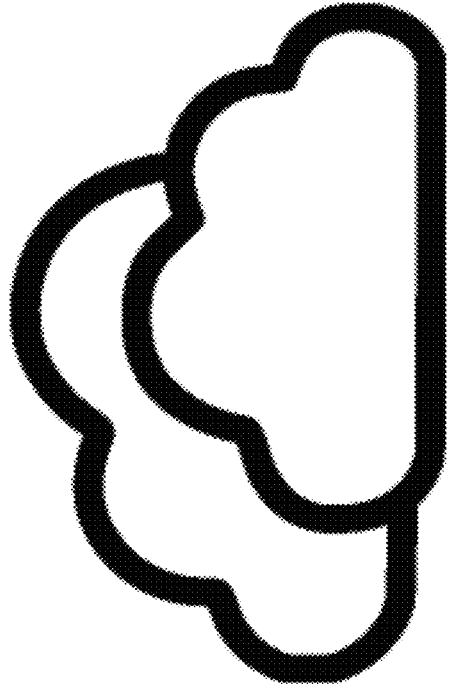

PROFESSIONALLY PROVING YOUR POINT USING FORMATTING TOOLS

EFFECTING MULTI-STEP OPERATIONS IN AN APPLICATION IN RESPONSE TO DIRECT MANIPULATION OF A SELECTED OBJECT

CROSS-REFERENCE TO RELATED APPLICATION(S)

This application claims the benefit of U.S. Provisional Application Ser. No. 62/294,963, filed Feb. 12, 2016.

BACKGROUND

An electronic document is a media content file generally intended to be "consumed" (i.e. used) in electronic or printed form. When creating (as new or as a modified) content in electronic documents, the visual presentation (e.g., layout, view, style) of the content is an area where productivity applications provide numerous tools (with commands and functions).

Currently, when changing content layout, views, or styles in an electronic document, users may be forced to choose from a representation of the style, such as a template in a gallery, or must manually create a custom layout for arranging content. Manually creating a custom layout generally involves searching through multiple menus to select a number of commands to often only affect one type of object at a time. This is problematic as most users are not content designers and have difficulty arranging content in a layout that conveys their intentions. In addition, selecting multiple commands can be challenging while in a touch-mode interface.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

An electronic document having a current layout can be presented in an application user interface. An interaction with a selected object of content in the electronic document can be detected. Based on the detected interaction, an intent can be determined. The determined intent can be used to identify different sets of commands that result in corresponding visual representations that are likely to satisfy the determined intent. Different activation regions, including different portions of a border of the electronic document, can be defined within the electronic document. A different command set, each identified from the determined intent, is associated with each different activation region. Movement of the selected object to a position within an activation region is detected, and the command set associated with the activation region is executed to perform a multi-step operation that modifies at least the current layout of the electronic document to result in the corresponding visual representation. In addition to layout, styles and formats may be modified by command steps executing the multi-step operation to achieve the visual representation.

The activation regions of the electronic document can be identified to a user by a visual marker (also referred to as an indicator) overlaying the region. A description, graphical icon, or other visualization can be used as the visual marker. A preview of the visual representation corresponding to the multi-step operation provided by the command set associated with an activation region can be presented in an overlay to the application user interface when at least a portion of the selected object is detected within the activation region. Although a preview is shown, the command set associated with the activation region is executed only after a release action is detected while the at least the portion of the selected object is within the activation region. If the selected object is released while outside the activation region, the command set associated with the activation region is not executed so there is no need to perform a multi-step "undo" operation to return the electronic document to its original state.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIGS. 2A-K illustrate effecting multi-step operations in an application in response to direct manipulation of a selected object for an example touchscreen computing device implementation.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the scope of the claimed subject matter. Aspects of the described subject matter can be implemented for and/or by various operating environments, computer networks, platforms, frameworks, computer architectures, and/or computing devices. Aspects of the described subject matter can be implemented by computer-executable instructions that can be executed by one or more computing devices, computer systems, and/or processors.

Figure 1:
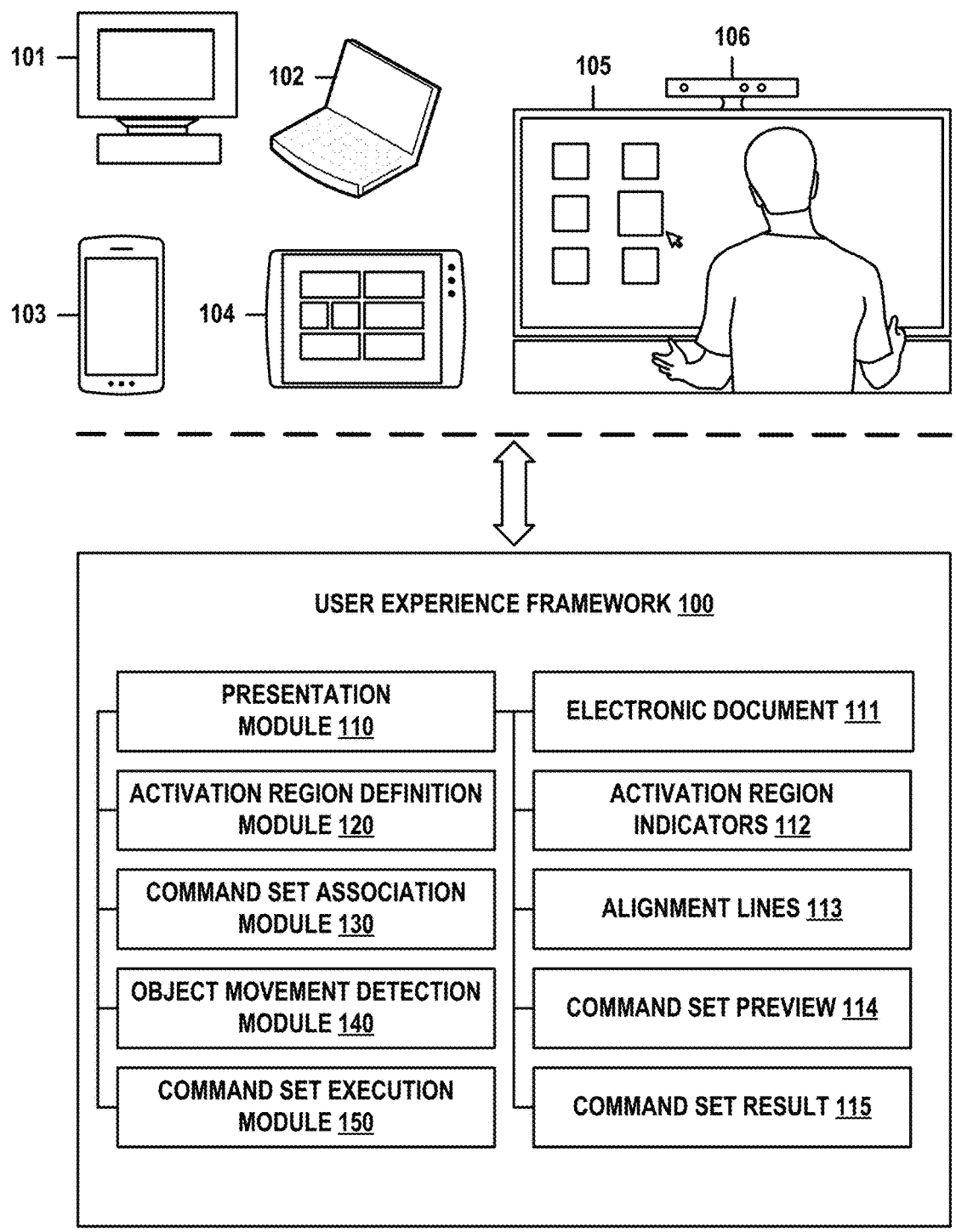
FIG. 1 illustrates an embodiment of an example architecture in accordance with aspects of the described subject matter.

FIG. 1 illustrates a user experience framework 100 as an embodiment of an example architecture in accordance with aspects of the described subject matter. User experience framework 100, or portions thereof, can be implemented by various computing devices and can be implemented by software, hardware, firmware or a combination thereof in various embodiments.

Implementations of user experience framework 100 are described in the context of one or more computing devices configured to perform various steps, methods, and/or functionality in accordance with aspects of the described subject matter. For instance, user experience framework 100 can be implemented by one or more computing devices, such as client devices 101-106. Client device 101 is shown as a personal computer (PC). Client device 102 is shown as a laptop computer. Client device 103 is shown as a smartphone. Client device 104 is shown as a tablet device. Client device 105 and client device 106 are shown as a television and a media device (e.g., media and/or gaming console, set-top box, etc.). It is to be understood that the number and types of client devices 101-106 are provided for purposes of illustration. User experience framework 100 also can be implemented by one or more computing devices of a computer system configured to provide server-hosted, cloud-based, and/or online services in accordance with aspects of the described subject matter.

In general, a computing device (e.g., one of client devices 101-106 and/or a computing device of a computer system) can include a combination of hardware and software. A computing device can include one or more processors and storage devices (e.g., memory and disk drives) as well as various input devices, output devices, communication interfaces, and/or other types of devices. In various implementations, a computing device can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter. It can be appreciated that various types of computer-readable storage media can be part of a computing device. As used herein, the terms "computer-readable storage media" and "computer-readable storage medium" do not mean and unequivocally exclude a propagated signal, a modulated data signal, and/or or a carrier wave.

A computer system can be implemented by one or more computing devices such as server computers configured to provide various types of services and/or data stores in accordance with aspects of the described subject matter. Example server computers can include, without limitation: web servers, front end servers, application servers, database servers (e.g., SQL servers), domain controllers, domain name servers, directory servers, and/or other suitable computers. Computer system 100 can be implemented as a distributed computer system in which components are located on different computing devices that are connected to each other through a network (e.g., wired and/or wireless) and/or other forms of direct and/or indirect connections.

In some implementations, a computer system can provide hosted and/or cloud-based services using redundant and geographically dispersed datacenters with each datacenter including an infrastructure of physical servers. For instance, a computer system can be implemented by physical servers of a datacenter that provide shared computing and storage resources and that host virtual machines having various roles for performing different tasks in conjunction with providing cloud-based services. Example virtual machine roles can include, without limitation: web server, front end server, application server, database server (e.g., SQL server), domain controller, domain name server, directory server, and/or other suitable machine roles.

In implementations where user-related data is utilized, user experience framework 100 and/or computing devices (e.g., client devices 101-106, computing devices of a computer system, etc.) that provide and/or support user experience framework 100 can employ a variety of mechanisms in the interests of user privacy and information protection. Such mechanisms can include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and/or other suitable mechanisms for protecting user privacy.

Implementations of user experience framework 100 are described in the context of "computer-executable instructions" that are executed to perform various steps, methods, and/or functionality in accordance with aspects of the described subject matter. Computer-executable instructions can be embodied and/or implemented in various ways such as by a computer program (e.g., client program and/or server program), a software application (e.g., client application and/or server applications), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

User experience framework 100 can include one or more program modules for performing operations in accordance with the described subject matter. Generally, program modules of user experience framework 100 are implemented as computer-executable instructions, computer programs, computer program components, software code, routines, APIs, functions, methods, objects, data structures, and/or the like, which perform various steps, methods, and/or functionality in accordance with aspects of the described subject matter. Program modules of user experience framework 100 can be stored on one or more computer-readable storage media and executed by one or more processors to perform various steps, methods, and/or functionality. Aspects of the described subject matter can be practiced in distributed computing environments where tasks are performed by remote computing devices, or within a cloud of computing devices, that are linked through a communications network. In a distributed computing environment, program modules of user experience framework 100 can be located in both local and remote computer-readable storage media including memory storage devices.

Program modules of user experience framework 100 can include a presentation module 110, an activation region definition module 120, a command set association module 130, an object movement detection module 140, and a command set execution module 150. While such program modules are shown in block diagram form to describe certain functionality, it is to be understood that the functionality performed by a single program module can be performed by multiple program modules and that a single program module can be configured to perform functionality described as being performed by multiple computer program modules. It is also to be understood that user experience framework 100 may include some of such program modules, all of such program modules, or additional program modules in various embodiments.

Presentation module 110 can be configured, programmed, and/or utilized to present an electronic document 111 within an application user interface. The application user interface can be implemented for various applications including, but not limited to: a word processing application, a slideshow presentation application, a spreadsheet application, a note taking applications, a messaging application, a web page design application, and/or other types of applications that enable users to author and edit content. These applications may collectively be referred to as productivity applications. Electronic document 111 can be a word processing document, a slideshow presentation document, a spreadsheet document, a note taking document, an email message, a web page document, and/or other type of electronic document having editable content.

The application user interface and/or electronic document 111 can operate in various modes (e.g., reading mode, editing mode, slideshow mode) or orientations (e.g., portrait view, landscape view, a 50/50 view) and can be designed to provide consistent appearance and functionality in multiple modes and/or multiple orientations. The application user interface and/or electronic document 111 can be implemented by or for an application that operates across various touchscreen devices (e.g., desktop, laptop, tablet, mobile phone) and/or form factors and can be designed to provide consistent appearance and functionality across multiple touchscreen devices and/or multiple form factors. The application user interface and/or electronic document 111 can be implemented by or for an application that operates across various operating systems (e.g., a Microsoft® Windows® operating system, a Google® Android™ operating system, an Apple iOS™ operating system) and can be designed to provide consistent appearance and functionality across multiple operating systems.

Activation region definition module 120 can be configured, programmed, and/or utilized to define the number and locations of different activation regions within electronic document 111. Activation regions can be invisible to the user and implemented as transparent overlays within electronic document 111. These invisible activation regions may at times include visual aspects so that a user can be made aware of their locations and/or resulting effects of being interacted with. The particular locations of the activation regions with respect to the view screen and/or window can be dynamic (where the region boundaries and coordinates during a particular content creation/modification session can change and even be available or not be available depending on various factors such as but not limited to the content, view, or layout of the electronic document and/or window). In some cases, one or more of the activation regions is static (by being in a same position—relative to a boundary or other aspect—even if assigned different command sets).

Each activation region can be implemented as a snappable area, such as a rectangular area defined by horizontal and vertical coordinates, that includes a different point (e.g., corner, midpoint of an edge, etc.) along the border of electronic document 111 or an edge of a column of electronic document 111. In such implementation, dragging and/or dropping the selected object into a snappable area can cause functionality of an activation region to be executed. The snappable area can operate like a region incorporating a snap function that causes a window to be aligned or resized, for example, when moved to an edge (e.g., a snappable area) of the screen.

Command set association module 130 can be configured, programmed, and/or utilized to associate command sets with activation regions. The command set association module 130 can incorporate an intent determination module to identify a user's intent with respect to an interaction with an object and provide command sets that, when executed, result in visual representations having a likelihood of satisfying a determined (by the intent determination module/command set association module) one or more intents.

Each different activation region (of the activation regions "activated" to provide multi-step operations) can be associated with a different command set, and each different command set can be executed to perform a different multi-step operation. For example, each different multi-step operation can modify a current content layout of electronic document 111 in a different way.

A set of commands associated with an activation region (to provide the multi-step operation) can include a plurality of: an object positioning command, an object resizing command, an object formatting command, a text positioning command, a text formatting command, a column layout command, a section layout command, and the like. Different command sets can include different subsets or combinations of commands.

Command sets can include various commands selected from the commands enabled by an application. For instance, command sets can include subsets and combinations of commands provided by a ribbon (e.g., tabbed set of toolbars) of an application. In various implementations, the different command sets are contextually related and relevant to a user's interaction with electronic document 111 and are designed to provide the user with multiple options related to the context. For example, different command sets can provide the user with multiple content layouts when the user interacts with electronic document 111 to arrange content. The particular command sets and the activation regions can be triggered from the content in the document being interacted with. The command set association module 130 can associate activation regions with sets of commands determined to have likelihood above a certain threshold that user would like based on a determination of intent of the interaction. In this way, the particular command sets associated with the particular activation regions can be considered intent-based.

The command sets associated with the activation regions can be selected as the top command sets believed or predicted to be the most relevant to the user or a community of users based on the context. The context may include, but is not limited to, one or more of application state, operation/command history, type of current interaction and relationship between a selected object and other content in the electronic document. A command set can be, for example: a command set most-frequently used by a community of users and/or the user, a most-recently used command set, a predicted command set, a default command set, a designer proposed command set, and the like.

The selection of the commands included in a particular command set can be determined from and/or based on frequency metrics such as service quality management (SQM) metrics or other usage metrics. For example, a provider of one or more applications can accumulate usage data from one or more groups of testers to determine which sequences of application commands are most frequently used. The provider can then develop and integrate the activation regions and associated command sets into an application so that the most frequently used command sets are easily accessible to a user.

Predicted user behavior can be determined using one or more machine learning techniques such as: supervised learning techniques (e.g., Support Vector Machine (SVM), Conditional Random Fields (CRFs), decision tree (e.g., boosted, bootstrap aggregated, ensemble, random forest, and the like), k-Nearest Neighbors (k-NN), Naive Bayes, Bayesian networks, neural networks, logistic regression, and the like); unsupervised learning techniques (e.g., clustering (e.g., k-mean, mixture model, hierarchical, and the like), hidden Markov models, blind signal separation, and the like); semi-supervised learning techniques; data mining techniques; and/or other artificial intelligence and/or machine learning techniques. Such techniques can be employed for predicting intended user actions and/or command sets.

Different activation regions and associated command sets can be predefined and/or dynamically defined when electronic document 111 is opened, when an object in electronic document 111 is selected, when a selected object is moved in electronic document 111, and/or based on another context related to electronic document 111. Different activation regions and associated command sets can be automatically defined based on the type (e.g., word processing, slideshow presentation, etc.) of electronic document 111 and/or current page layout (e.g., page orientation, number of columns, document sections, etc.) of electronic document 111. Different activation regions and associated command sets can be defined based on the type of objects (e.g., image, table, shape, etc.) contained and/or selected in electronic document 111. Different activation regions and associated command sets can be enabled or disabled based on the movement of a selected object within electronic document 111.

The different activation regions, for example, defined by the activation region definition module 120 described with respect to FIG. 1, can include different portions of a border of electronic document. In an example implementation, different activation regions respectively can include: the upper right corner of electronic document, the midpoint of the right edge of electronic document, the lower right corner of electronic document, the upper left corner of electronic document, the midpoint of the left edge of electronic document, the lower left corner of electronic document. In some cases, the different activation regions can further include the midpoint of the top edge of electronic document and the midpoint of the bottom edge of electronic document. In some cases, such when electronic document has a multi-column format, the different activation regions can include a point along the top edge of a column (e.g., the midpoint of the top edge of the column, a point near the top right corner of the column), a point along the bottom edge of the column (e.g., the midpoint of the bottom edge of the column, a point near the bottom left corner of the column), and the midpoint of the left edge of the column.

In some cases, command set association module 130 and/or activation region definition module 120 and/or another component or module can be used to determine where the activation regions are to be defined and/or when a visual aspect for the activation region is presented.

Object movement detection module 140 can be configured and/or utilized to detect movement of a selected object within electronic document 111. Example objects include an image, table, shape, a block of text, and the like. An object can be selected in response to a user tapping the object, the user placing an insertion pointer over the object and clicking a mouse or touch pad button, or in other ways. In response to movement of the selected object by the user, object movement detection module 140 can determine whether the selected object is within a particular activation region or outside of the activation regions. In some implementations, object movement detection module 140 can determine whether a particular point or portion of the selected object is within a particular activation region.

Presentation module 110 can be configured, programmed, and/or utilized to display activation region indicators 112 within (or overlayed) electronic document 111 in response to movement of the selected object. Activation region indicators 112 can be implemented as graphics and/or icons (or other visual marker), which are displayed when the selected object is moved to provide the user with hints. When the selected object is being moved by the user, activation region indicators 112 can be displayed in proximity to activation regions to indicate where the user can move and place (e.g., drag and drop) the selected object to execute associated command sets. In some implementations, activation region indicators 112 can be icons that graphically represent the end results of executing the command sets associated with the activation regions. In some implementations, activation region indicators 112 can be arrows or include highlighting.

In some cases, presentation module 110 can be configured, programmed, and/or utilized to display alignment lines 113 within electronic document 111 in response to movement of the selected object. Alignment lines 113 can be implemented as a horizontal line and/or as a vertical line. The alignment lines 113 can be presented to facilitate acceptable placement positions for a selected object.

Command set execution module 150 can be configured, programmed, and/or utilized to execute command sets associated with the activation regions. Command set execution module 150 can execute a command set associated with a particular activation region in response to movement of the selected object to a position within the particular activation region and/or placement of the selected object in the particular activation region. Execution of a command set can effectuate a multi-step operation that changes at least the current layout of content in electronic document 111. The command set execution module 150 can be configured to execute a command set and perform the corresponding multi-step operation only after a release action is detected while at least a portion of the selected object is detected within the activation region.

Presentation module 110 can be configured, programmed, and/or utilized to display a command set preview 114 within electronic document 111 in response to movement of the selected object to a position within an activation region. Command set preview 114 can be displayed in response to the user dragging the selected object to a position within the activation region without dropping or placing the selected object in the activation region. Command set preview 114 can be implemented as a faded graphical representation that provides the user with a preview of the result of a command set associated with an activation region. The command set preview can show a layout (with any other style and formatting characteristics) that correspond to the multi-step operation provided by the command set associated with the activation region. The command set preview 114 can be generated in real time and/or can be generated when command sets are associated with activation regions. The command set preview 114 can be presented in an overlay to the application user interface in which the electronic document 111 is displayed.

Presentation module 110 can be configured, programmed, and/or utilized to display a command set result 115 within electronic document 111 in response to placement of the selected object in an activation region. Command set result 115 can be the result of the multi-step operation that changes the current layout of content in electronic document 111. Command set result 115 can replace command set preview 114 when the selected object is dropped/released in the activation region.

The improved functionality for application user interface and/or electronic document 111 can be utilized by touchscreen user interfaces provided on desktop, laptop, tablet, and/or mobile devices and can be implemented across various form factors, architectures, and/or applications. In terms of efficiency, especially in touchscreen implementations, utilization of activation regions and associated command sets provides advantages over the use of ribbon and/or toolbar commands, which require separate steps and are prone to user error. Of course, the described functionality for application user interface and/or electronic document 111 can be utilized with other user input configurations (besides touch).

By incorporating functionality in accordance with the described subject matter, an application user interface and/or electronic document 111 can automatically perform a multi-step operation to modify a current layout of electronic document 111 in response to direct manipulation of a selected object. As a result, a user can avoid the need to employ a toolbar and/or separate commands when arranging content in an electronic document so that it is easy for users to create an intended layout. Furthermore, the user can be provided with quick access to multiple options for comparison and/or selection. The design aids in multi-step interactions and allows content to be formatted through touch or mouse direct manipulation of a selected object rather than using menus or gallery representations. For example, by moving a selected object such as an image over another region of content such as text, a user can signal intent to rearrange a layout and the system can provide options to modify the layout using a single action to execute a multi-step operation. The options can be provided using activation regions (and previews or other visual representations) on which a user releasing the object can execute a set of commands to carry out the multi-step operation.

The following example embodiments, implementations, examples, and scenarios are provided to further illustrate aspects the described subject matter. It is to be understood that the following example embodiments, implementations, examples, and scenarios are provided for purposes of illustration and not limitation.

Example Implementations of Modifying Content Layout in an Electronic Document

FIGS. 2A-K illustrate effecting multi-step operations in an application in response to direct manipulation of a selected object for an example touchscreen computing device implementation. Touchscreen computing device 200 can be implemented as a touchscreen tablet device or other suitable touchscreen client device that can implement user experience framework 100 or portions thereof.

Figure 2A:
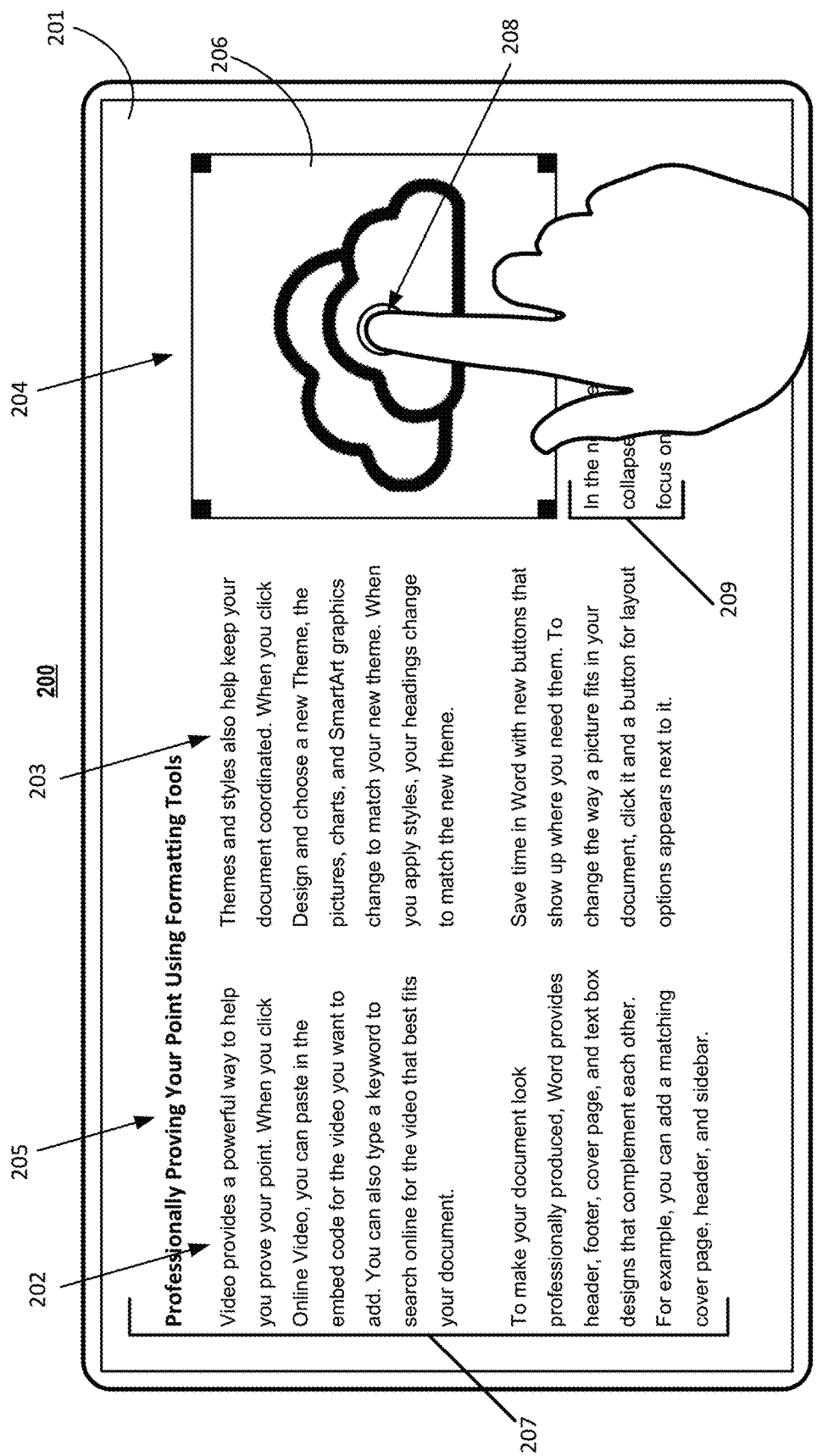

In FIG. 2A, touchscreen computing device 200 presents an electronic document within an application user interface 201. The displayed content of the electronic document has a current page layout and, as shown, includes a landscape orientation and a multi-column (e.g., a three-column) format (with a left column 202, a center column 203, and a right column 204). In this illustrative example, application user interface is a word processing application user interface operating in editing mode. Electronic document contains editable content including text and an image. The editable content within electronic document also includes a title 205 that spans multiple columns and text arranged within the columns.

Here, a user may select an image 206 located within the right column 204 of the current layout 207. Selected image 206 has been selected in response to touch input (e.g., a single tap 208) from a user. Various commands to enact operations on the selected object can be initiated through interaction with the object directly. For example, the selected image 206 can be resized by the user in response to further touch input such as pinching or spreading selected image. In addition to the single operations that may be executed through interacting with the object (in this case the image 206), multi-step operations can be accomplished through the described systems and techniques.

Figure 2B:
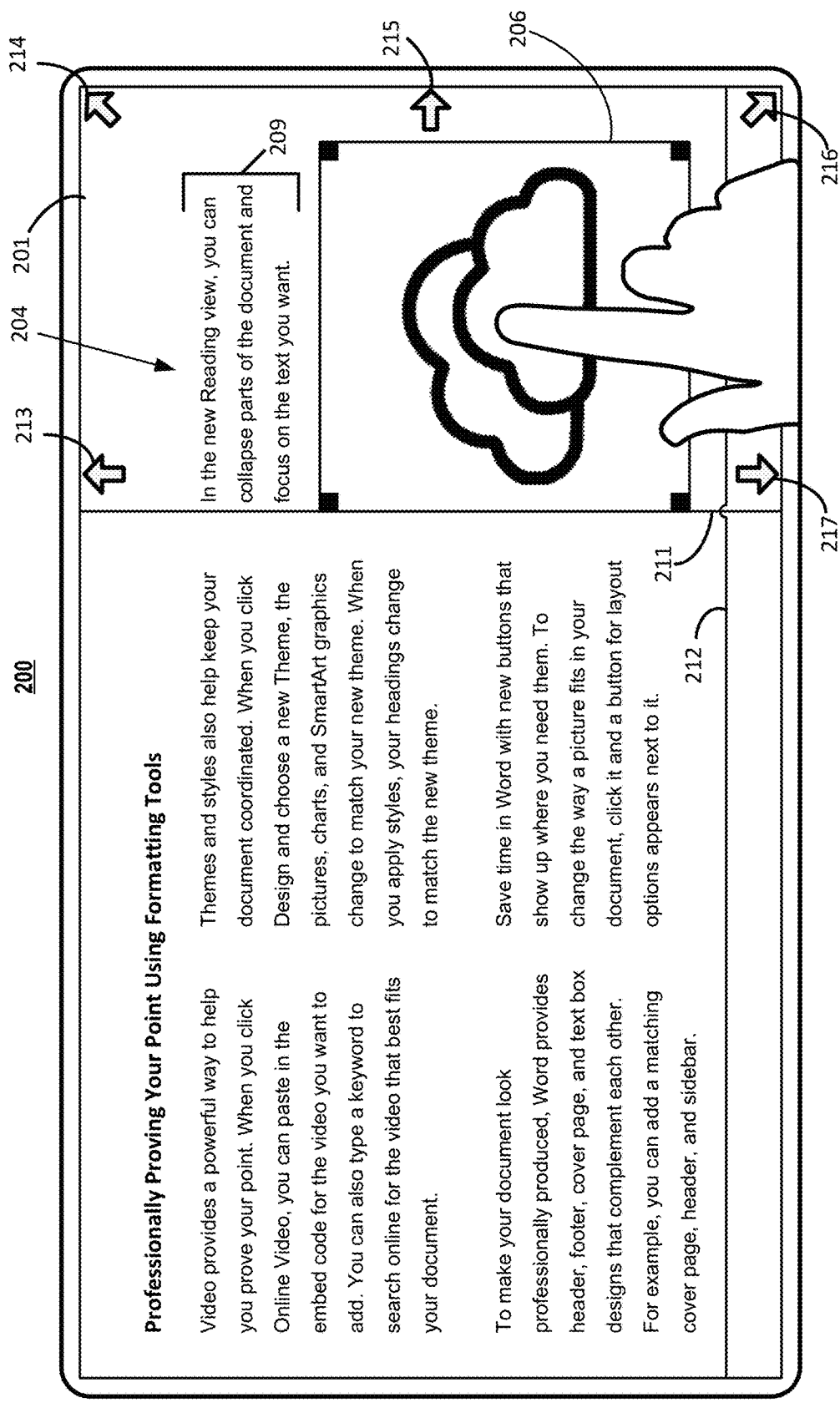

For example, FIG. 2B illustrates the result of a user dragging the selected image 206 downward over the text in the right column 204. When selected image 206 is moved downward over a block of text (such as text 209 shown in FIG. 2A), the text 209 is relocated (e.g., in a "reflow" process) above the selected image 206 within the current layout boundaries of the right column 204. Alignment boundaries (e.g., vertical alignment indicator 211 and horizontal alignment indicator 212) may appear to the user, showing where the user may release the image 206 to maintain the image in the particular column of the current layout. However, instead of being limited to a single operation through the manipulation of the selected image 206, a multi-step operation is possible through the direct manipulation of the selected image 206. Here, the system may have identified one or more intents from the interaction the user is having with the selected image 206 and can assign sets of commands to different activation regions.

The application user interface 201 can display indicators (e.g., arrows 213, 214, 215, 216, 217) on the electronic document that correspond to different activation regions. Indicators (such as arrows 213, 214, 215, 216, 217) are used to visually inform the user of the locations of activation regions, which are invisible to the user. For instance, activation regions can be implemented as transparent overlays within electronic document. The activation regions can be implemented as a snappable area along the border of electronic document or an edge of a column of electronic document so that dragging and/or dropping selected image into a snappable area causes functionality of (the set of commands assigned to) an activation region to be executed.

In this example embodiment, different activation regions may be located within the presentation of the electronic document at one or more of: the upper right corner, the right edge, the lower right corner, the upper left corner, the left edge, and the lower left corner. Different activation regions may also be located at one or more of: the top edge of the right column, the bottom edge of the right column, the left edge of the right column, the top edge of the center column, the bottom edge of the center column, the left edge of the center column, the top edge of the left column, and the bottom edge of the left column. In this example, because of the proximity of the user's interaction to a region of the electronic document, the activations regions designated by arrows 213, 214, 215, 216, and 217 are assigned a set of commands identified as being relevant to the user's intent to provide multi-step operations deemed likely to satisfy the user's intent. In certain cases, indicators for the different activation regions are displayed and hidden based on the relative position of a selected object. The activation regions can be considered regions of the document that are activated based on a determined intent of the user.

Figure 2C:
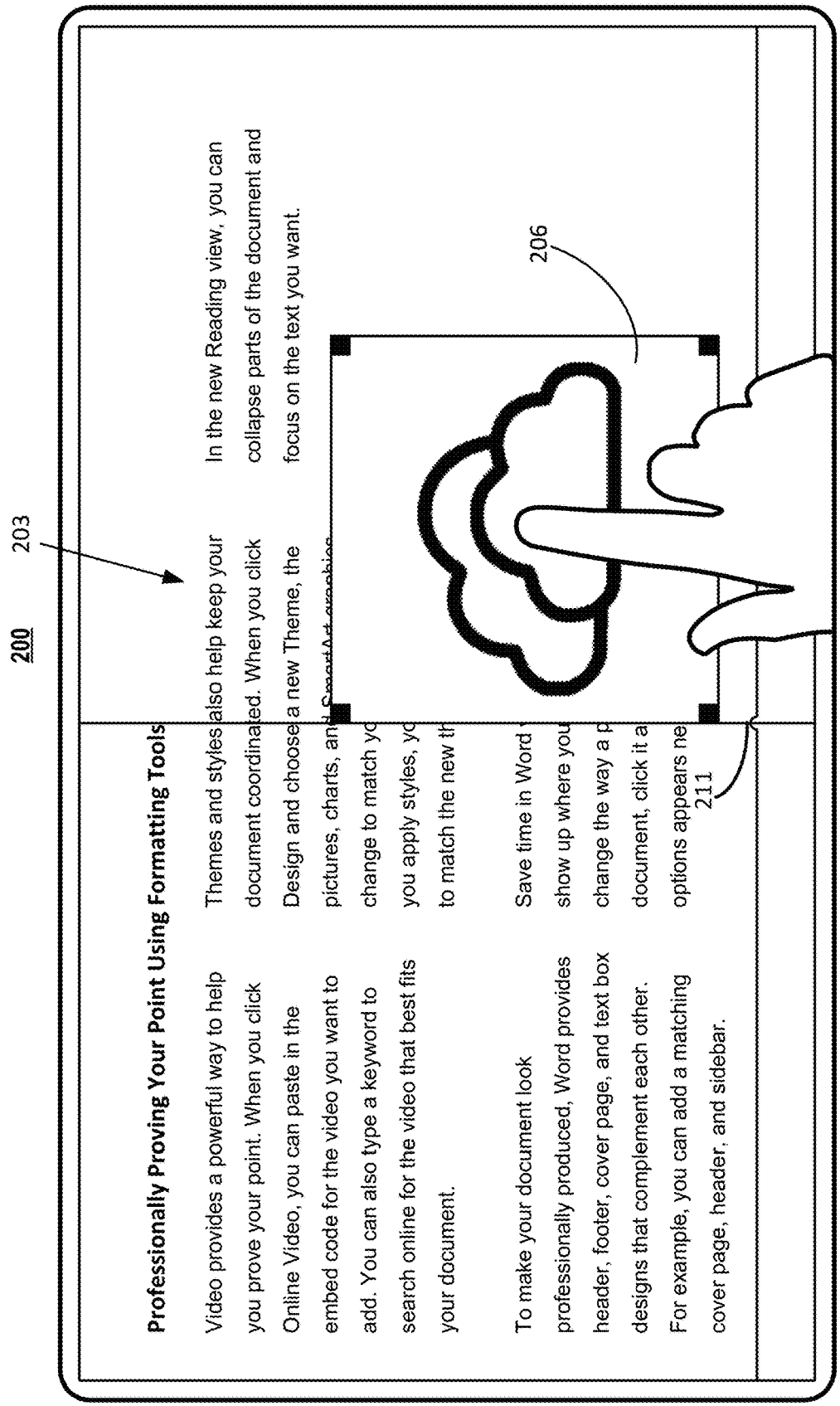

In FIG. 2C, selected image 206 is moved within electronic document in response the user dragging selected image to the left, as illustrated with vertical alignment indicator 211. In some cases, the vertical alignment indicator 211 may appear in a color representing that selected image 206 is not in an acceptable position for placement in the center column 203.

In FIG. 2D, selected image 206 is moved within electronic document in response the user continuing to drag selected image to the left. When selected image is moved to the left over text in the center column, the text may be relocated (or reflown) to the right column. At this time, the system may make a determination as to the intent of the user's interaction with the electronic document and activate regions with associated sets of commands. In this illustrative example, the system may have identified two possible desirable outcomes and present indicator arrows 218 and 219 for the different activation regions at the top edge of the center column (with arrow 219) and the bottom edge of the center column (with arrow 218).

Figure 2E:
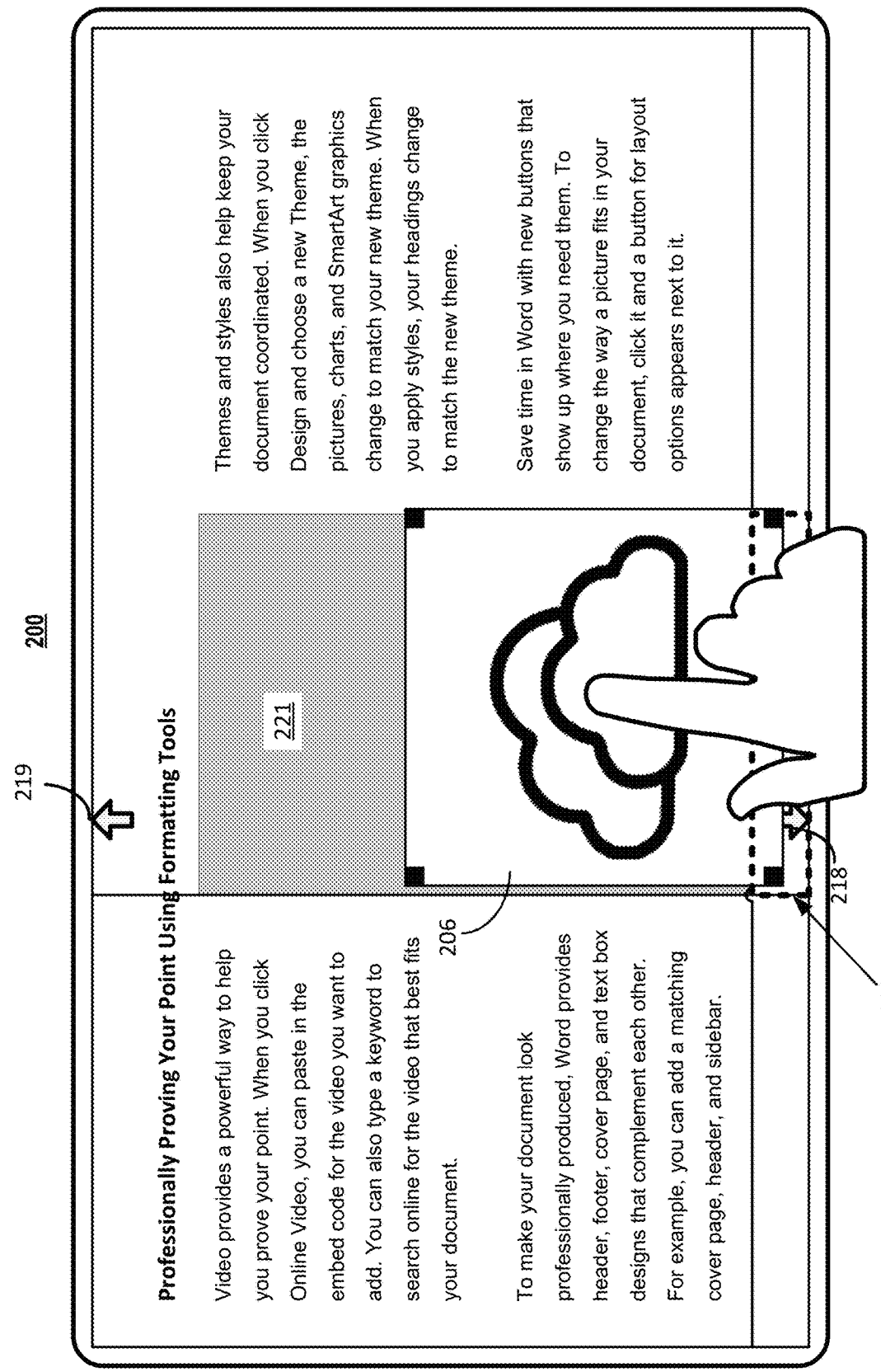

In FIG. 2E, a portion of the selected image is moved within activation region 220, which was indicated by arrow 218. Upon detecting the portion of the selected image 206 within the activation region 220, a live preview 221 can be presented to the user of the visual representation of the multi-step operation associated with that activation region 220. In the illustrative example, the live preview 221 can be shown as a faded graphical representation of the multi-step operation of: positioning selected image in the center column, resizing selected image to fit and fill the center column and positioning text (e.g., wrapping text) from the center column in the right column. There may be other aspects modified as part of the set of commands, including (but not limited to) adding a color border to the image.

Figure 2F:
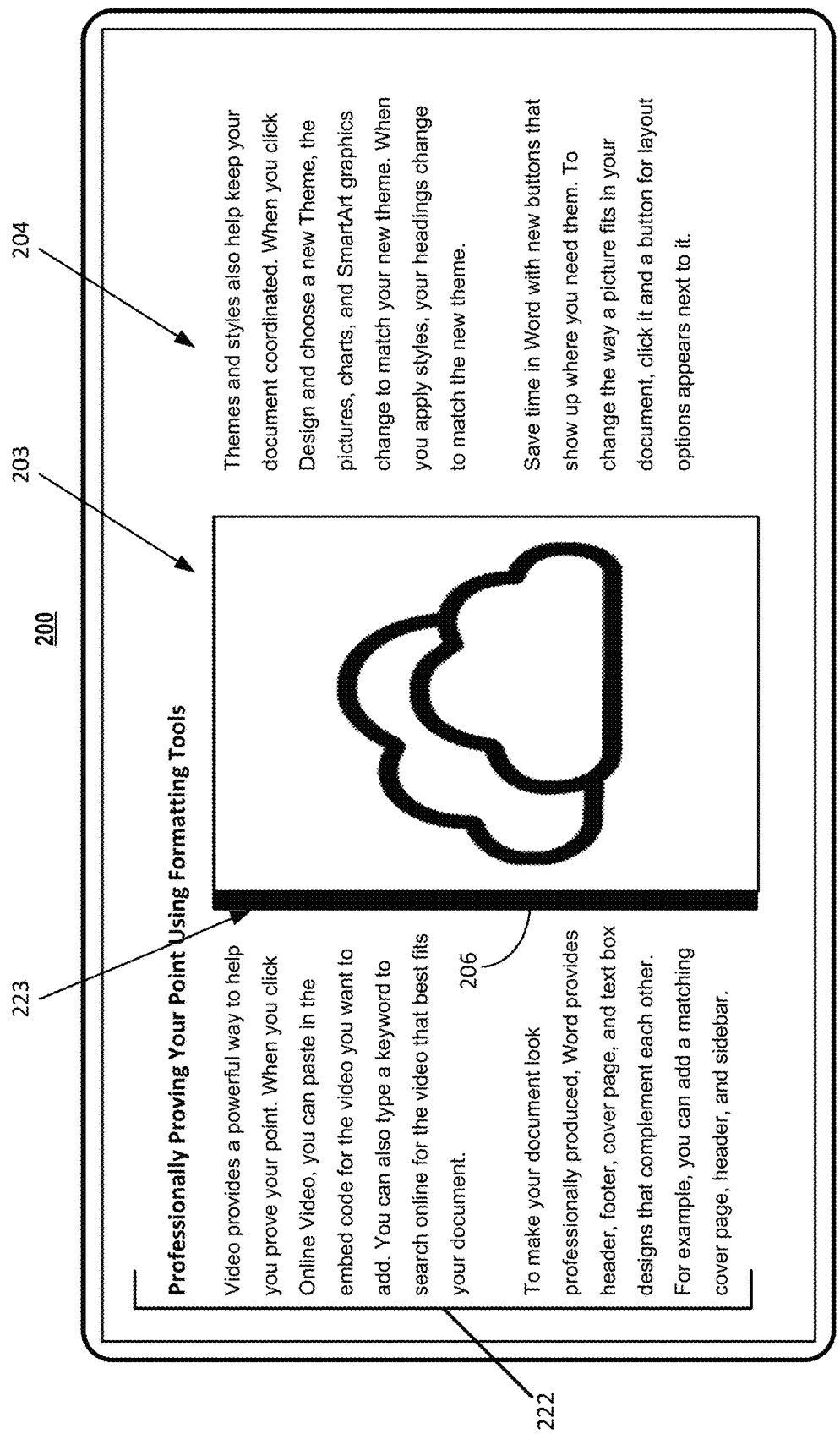

If the selected image 206 is released (or "dropped") while within the activation region 220, the multi-step operation can be executed and result presented as the new layout 222 shown in FIG. 2F. For example, the system can execute the set of commands including positioning the selected image in the center column 203, resizing the selected image to fit and fill the center column, reflowing text from the center column 203 to the right column 204, and adding a border 223 to the image 206.

In FIG. 2G, further manipulation of the content is shown. Here, the resized image 206 is selected and moved within electronic document in response the user tapping and then dragging selected and resized image to the left. When selected and resized image 206 is moved to the left over the text in the left column 202, the system may make a determination as to the intent of the user's interaction with the electronic document and activate regions with associated sets of commands. In this illustrative example, the system may have identified five sets of commands to present to the user. These sets of commands are assigned to regions and the activation regions are signaled to the user with indicator arrows 224, 225, 226, 227, and 228.

Figure 2H:
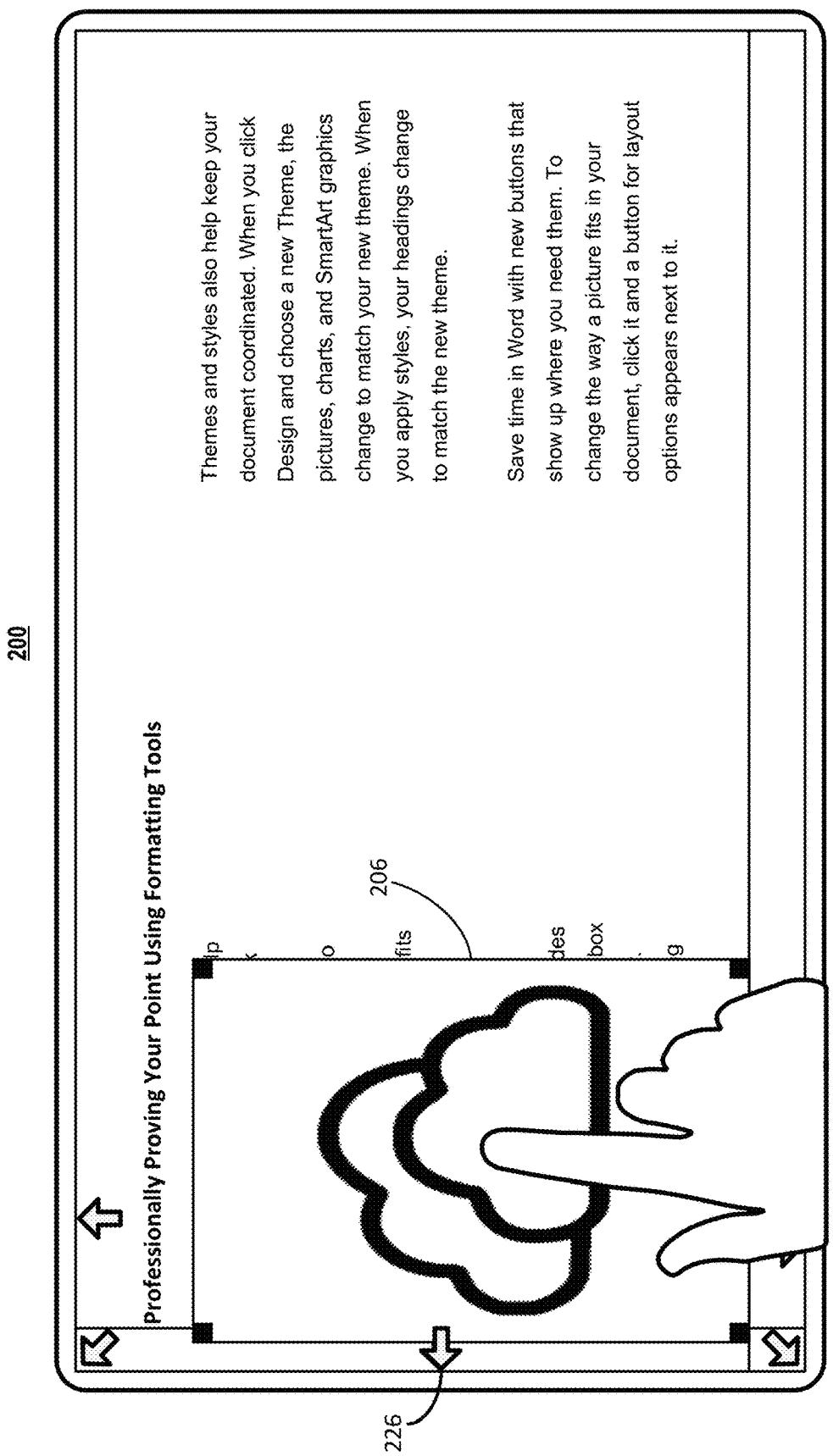
Figure 2I:
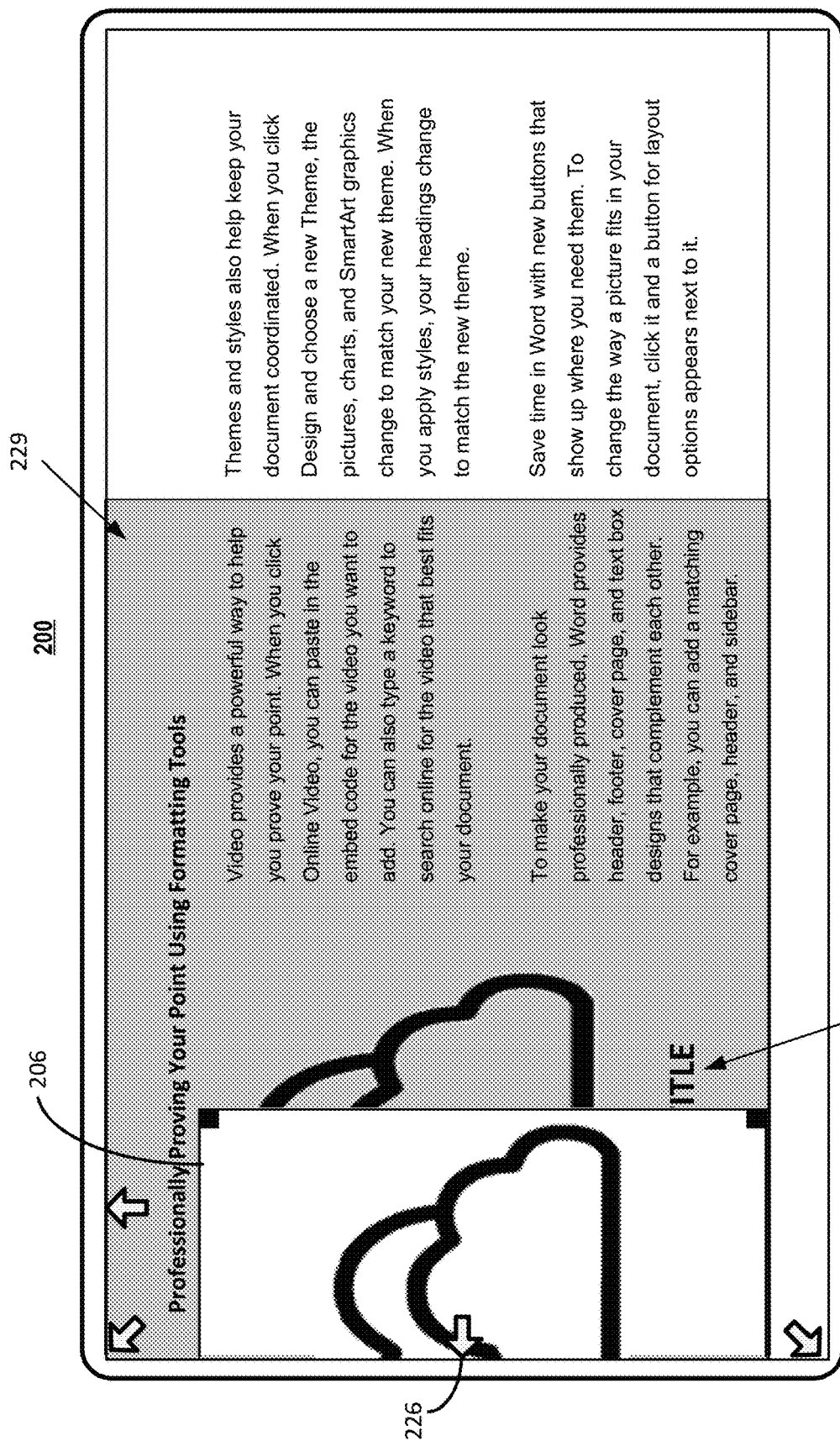

In FIG. 2H, the user can drag the image 206 to the activation region indicated by arrow 226. As a result, as shown in FIG. 2I, a live preview 229 of a multi-step operation result of the set of commands assigned to that activation region can appear. For the preview 229 of the multi-step operation corresponding to the set of commands associated with the activation region indicated by arrow 226, the corresponding visual representation maintains the three columns, but resizes the image, reflowing the text over to the center column 203, and adds a subtitle 230 on the image (shown in grey preview overlay). The actual commands are not executed with respect to the electronic document. Rather, a preview 229 is provided. Thus, when the system detects that the selected image 206 is no longer within the activation region indicated by arrow 226, the preview can disappear and the user can see that the electronic document returns to earlier view.

Figure 2J:
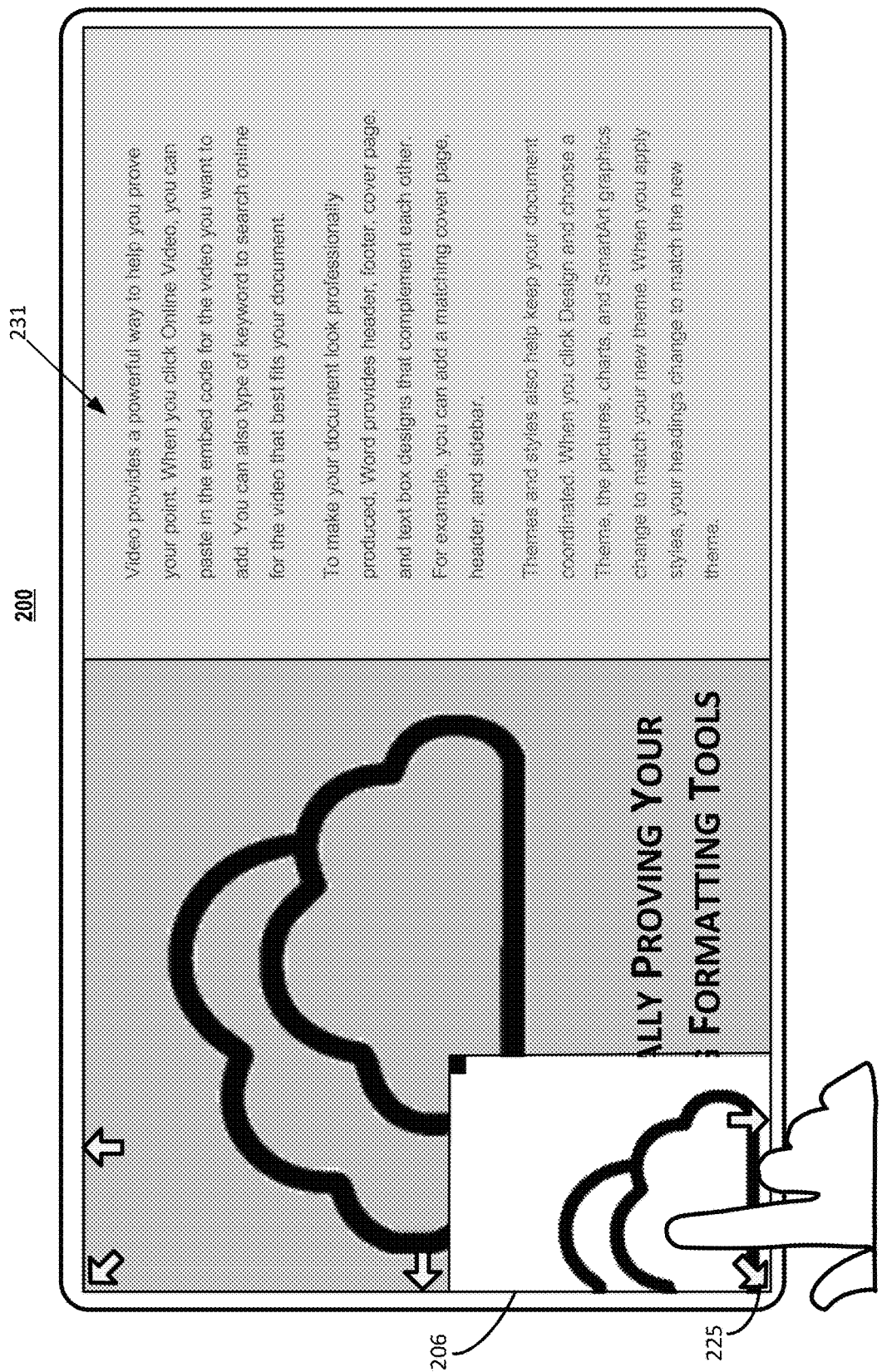

Then, as illustrated in FIG. 2J, if the selected image 206 is detected within the activation region indicated by arrow 225 in response the user dragging selected image 206 downward and to the left, a preview 231 visual representation of the multi-step operation of: changing the column layout of electronic document from three columns to two columns, enlarging selected and resized image to fill the new left column, repositioning and fitting text in the new right column, relocating the text of the title from the top left of electronic document to the bottom and over the enlarged image, and reformatting the relocated text of the title to have a new font and new size can be shown.

If a release of the selected image is detected while the image 206 is within the activation region indicated by arrow 225, then the set of commands are applied to provide the resulting layout (and other adjustments) 232 as shown in FIG. 2K. For example, execution of the command set provides a command set result of the multi-step operation of: changing the column layout of electronic document from three columns to two columns, enlarging selected and resized image to fill the new left column, repositioning and fitting text in the new right column, relocating the text of the title from the top left of electronic document to the bottom and over the enlarged image, and reformatting the relocated text of the title to have a new font and new size.

FIGS. 3A-H illustrate effecting multi-step operations in a presentation application in response to direct manipulation of a selected object for an example touchscreen computing device implementation. Touchscreen computing device 300 can be implemented as a touchscreen tablet device or other suitable touchscreen client device that can implement user experience framework 100 or portions thereof.

Figure 3A:
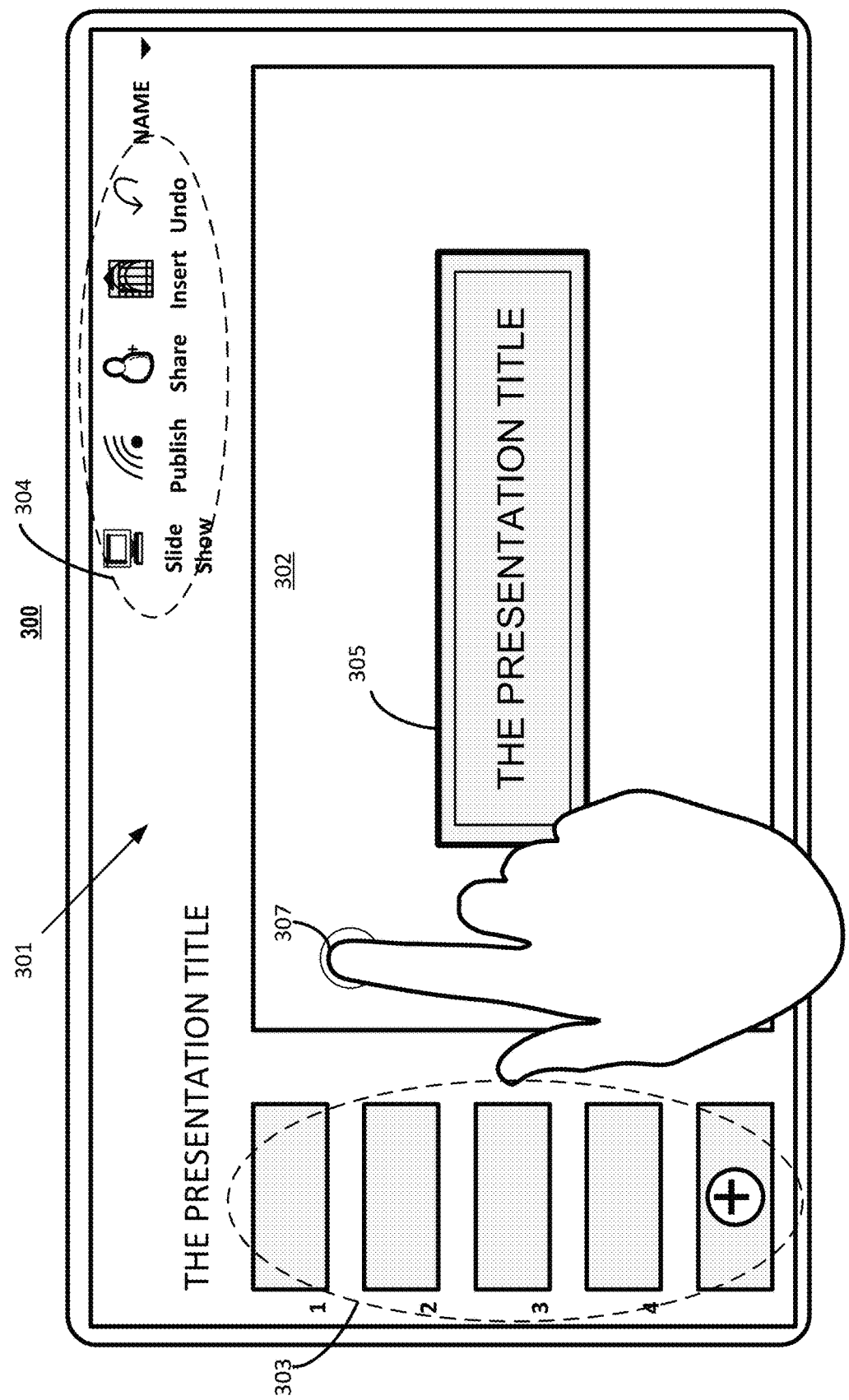
FIGS. 3A-H effecting multi-step operations in a presentation application in response to direct manipulation of a selected object for an example touchscreen computing device implementation.

In FIG. 3A, touchscreen computing device 300 presents electronic document within application user interface 301. Application user interface 301 is a slideshow presentation application user interface operating in editing mode. Electronic document has a current page layout that can be selected by a user and, as shown, includes a slide 302 having a landscape orientation and a title slide layout. Application user interface 301 includes slide thumbnails 303 and a toolbar 304. Electronic document contains a presentation title 305 located in a box in the center of the slide. In some cases, contextual menus such as menu 306 shown in FIG. 3B may be available, for example, in response to a user providing a touch input (e.g., a single tap 307). It should be understood, of course, that a mouse or other input device could be used to select and manipulate the content of the electronic document.

Figure 3B:
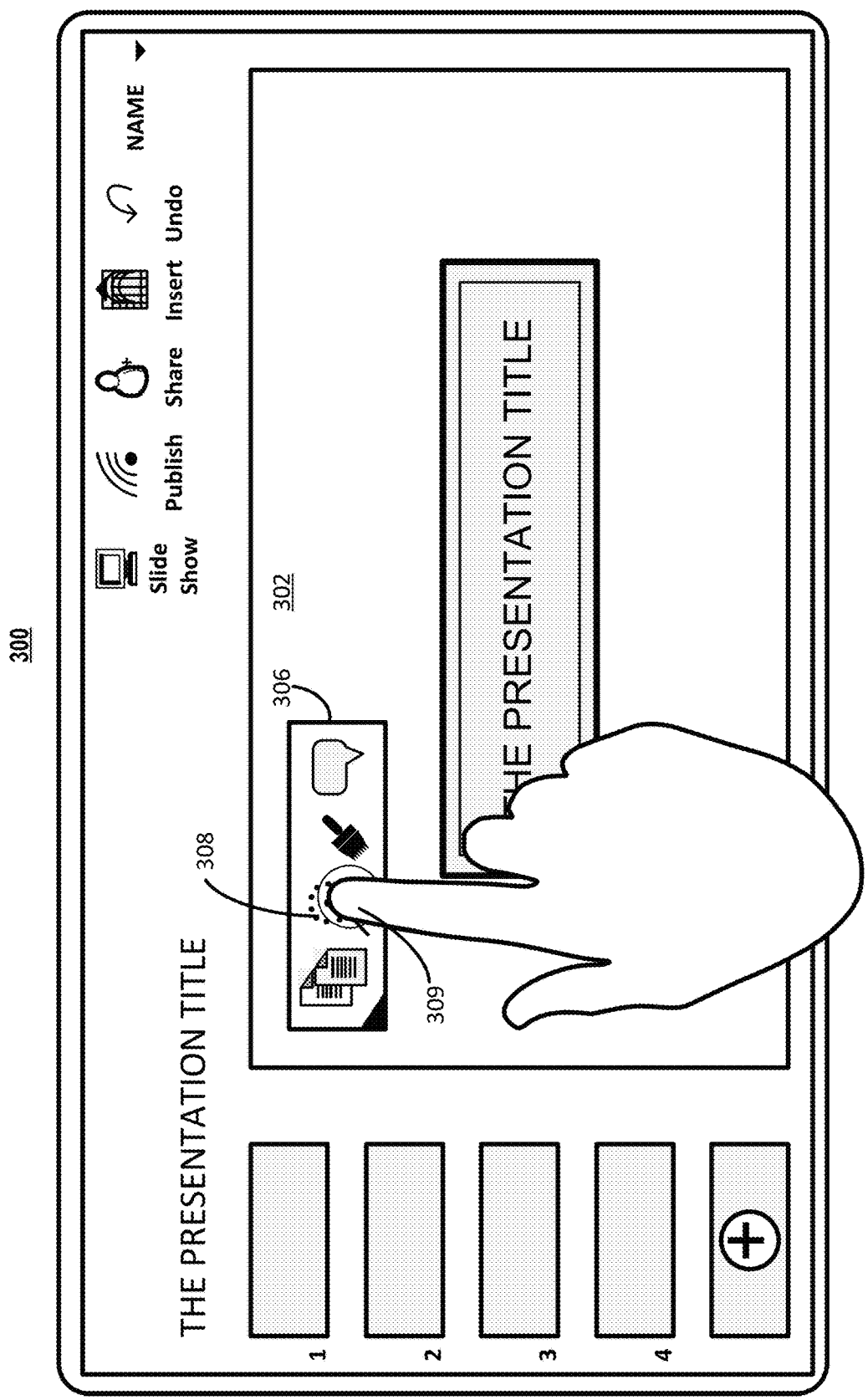

FIGS. 3B-3E illustrate a typical process to modify layout and style of an electronic document. In FIG. 3B, the menu bar 306 is displayed in response to the touch input 307 from the user. Menu bar 306 includes a layout button 308 that is selected by the user in response to further touch input (e.g., a single tap 309).

Figure 3C:
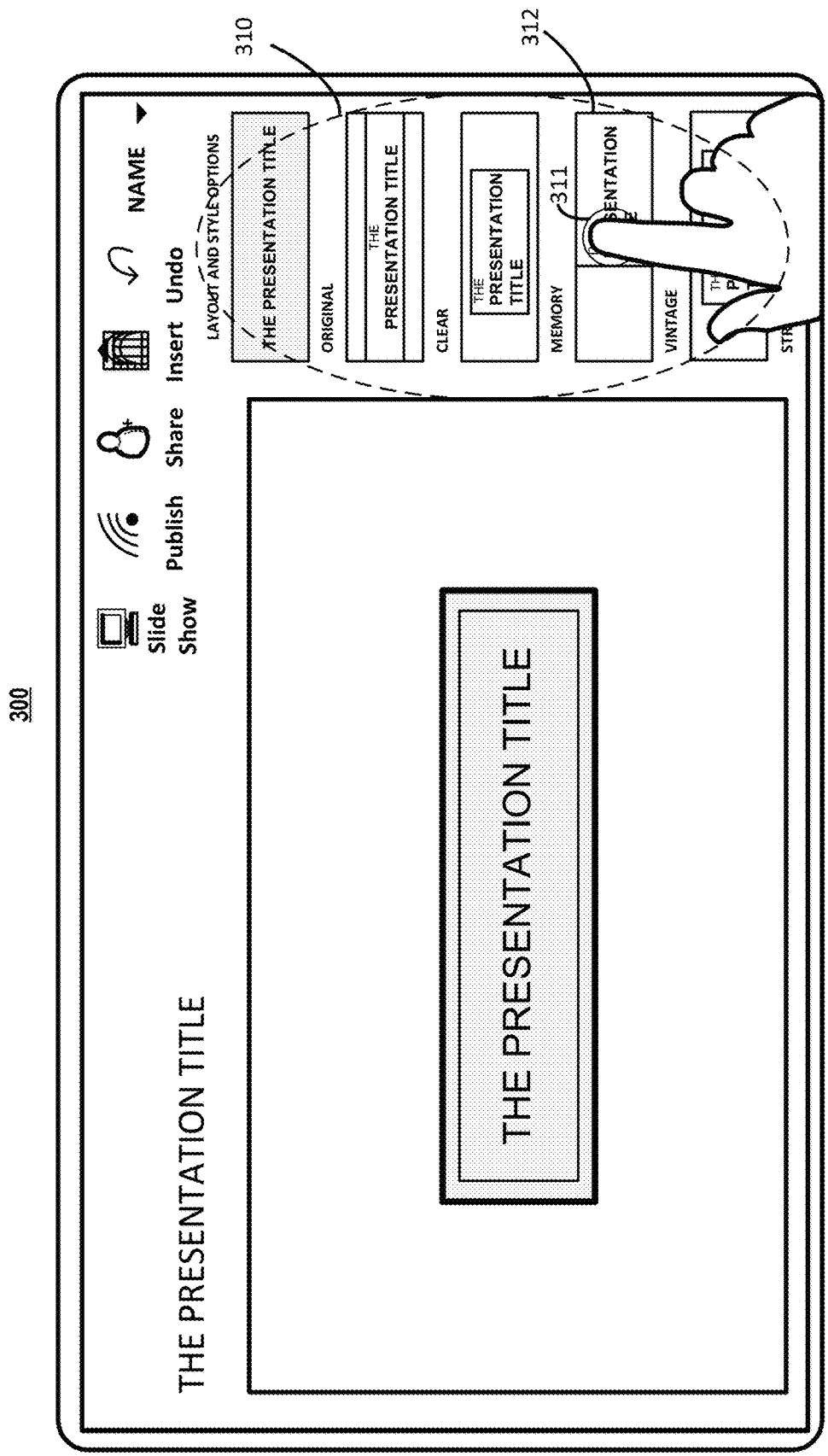

In FIG. 3C, a gallery 310 of layout and style options is displayed in response to the touch input 309 from the user on the layout button 308 of menu bar 306. Gallery 310, in this example, includes iconic representations of various layout and style options. A new layout (e.g., two-section layout) is selected in response to touch input (e.g., a single tap 311) from the user on an icon 312 for the two-section layout shown in FIG. 3D.

Figure 3D:
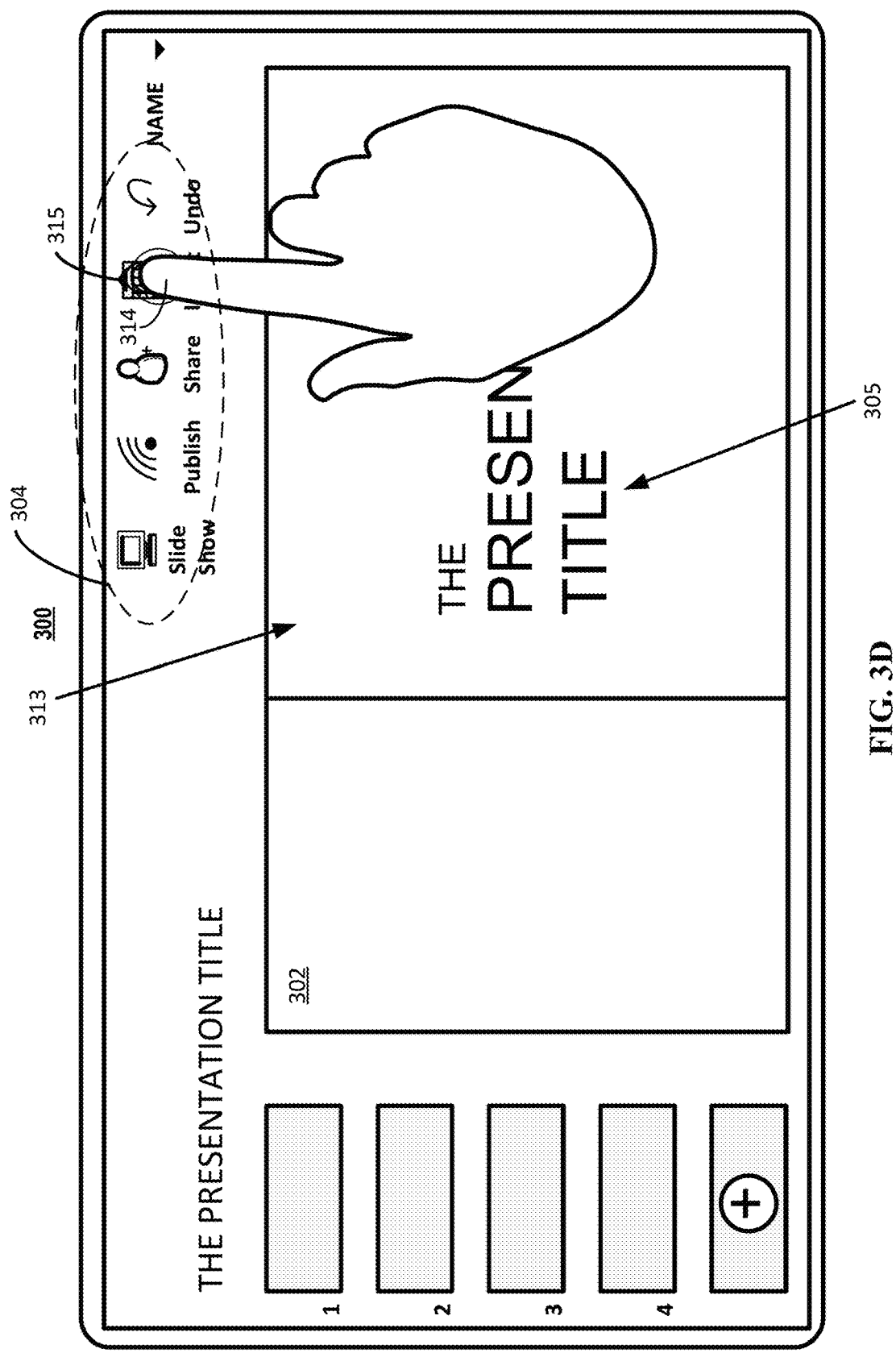
Figure 3E:
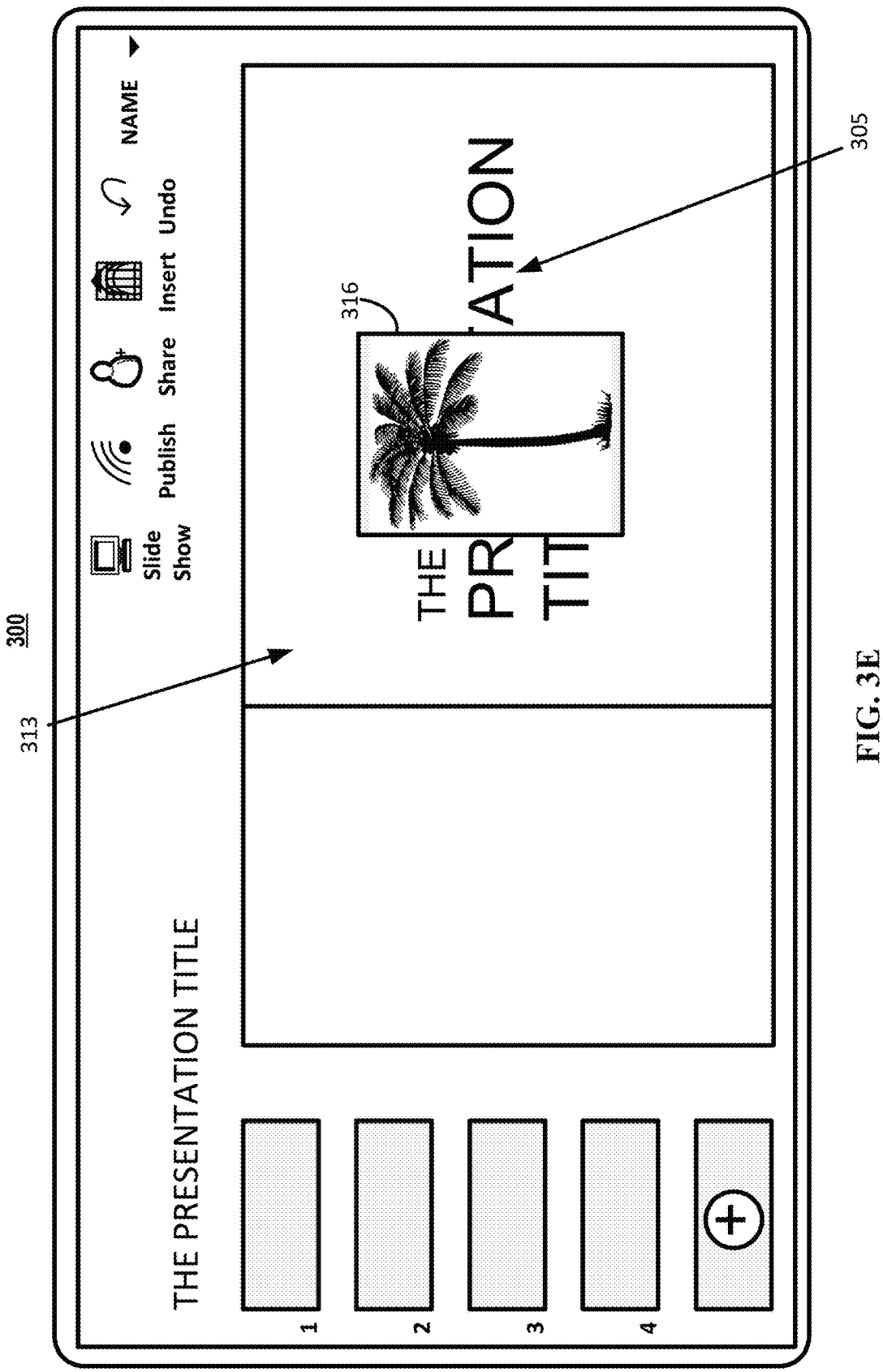

In FIG. 3D, electronic document is reformatted in accordance with the new layout selected by operation 311. As a result, the text of the presentation title 305 is reformatted (e.g., new font, new size) and positioned in the right section 313 of the slide 302. The user has selected (e.g., tapped 314) an insert icon 315 from toolbar 304. Selection of insert icon can allow the user to browse and choose an image to insert into electronic document such as shown in FIG. 3E, which shows image 316 inserted into the right section 313 of the electronic document and moved (e.g., by dragging) over the presentation title 305. From this state, FIGS. 3F-3H illustrate multi-step operation functionality according to certain aspects described herein.

Figure 3F:
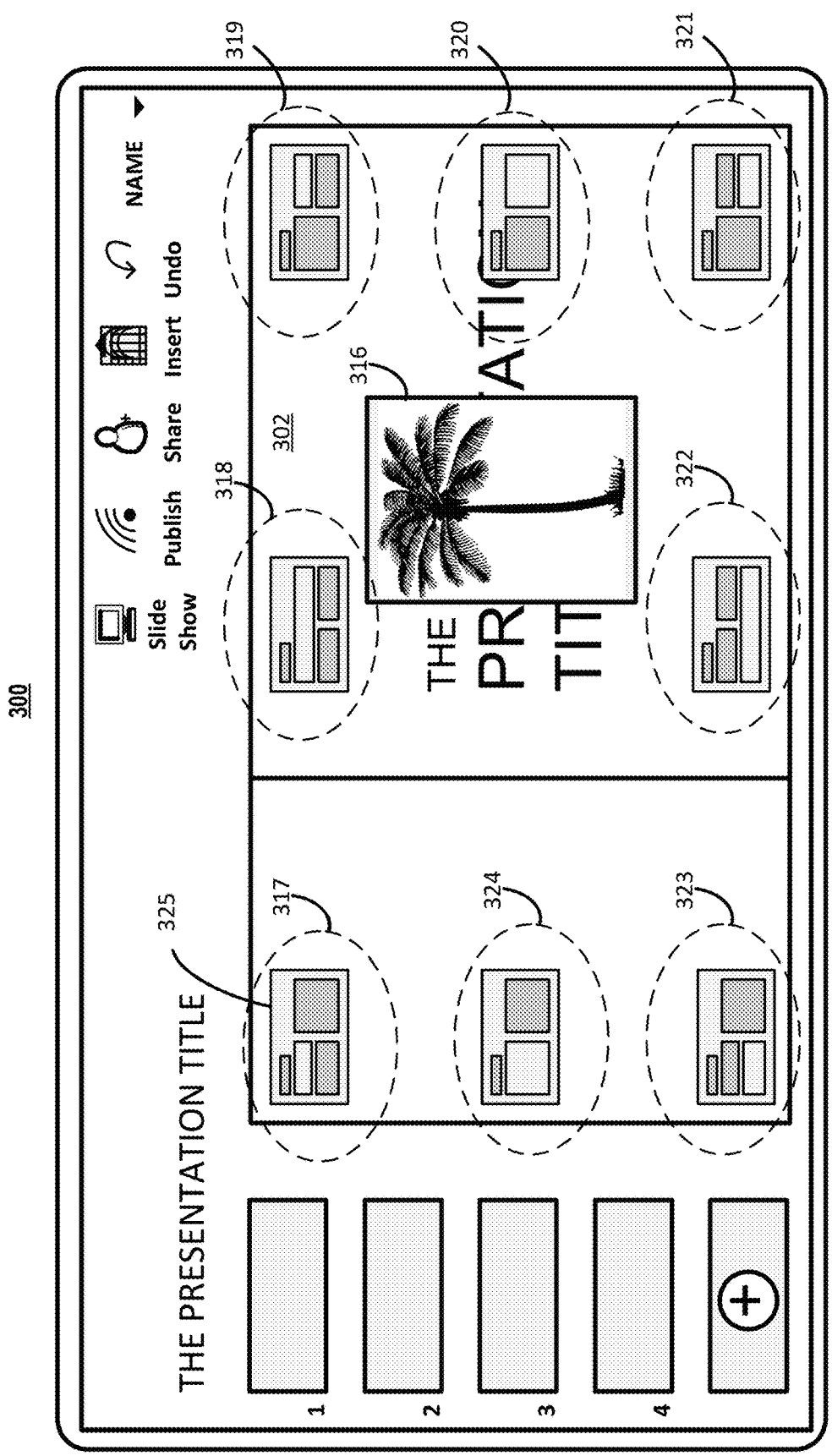
Figure 3G:
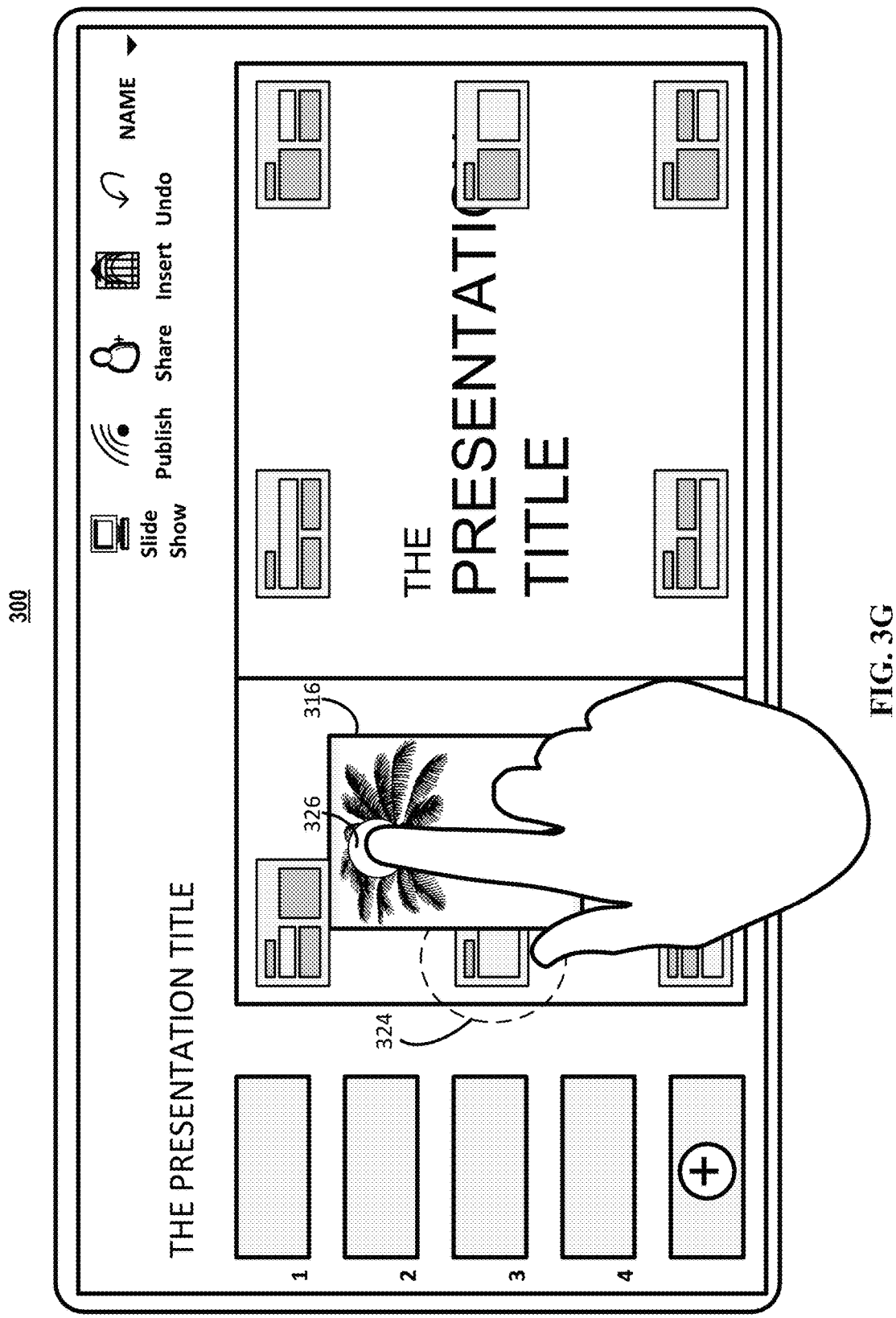
Figure 3H:
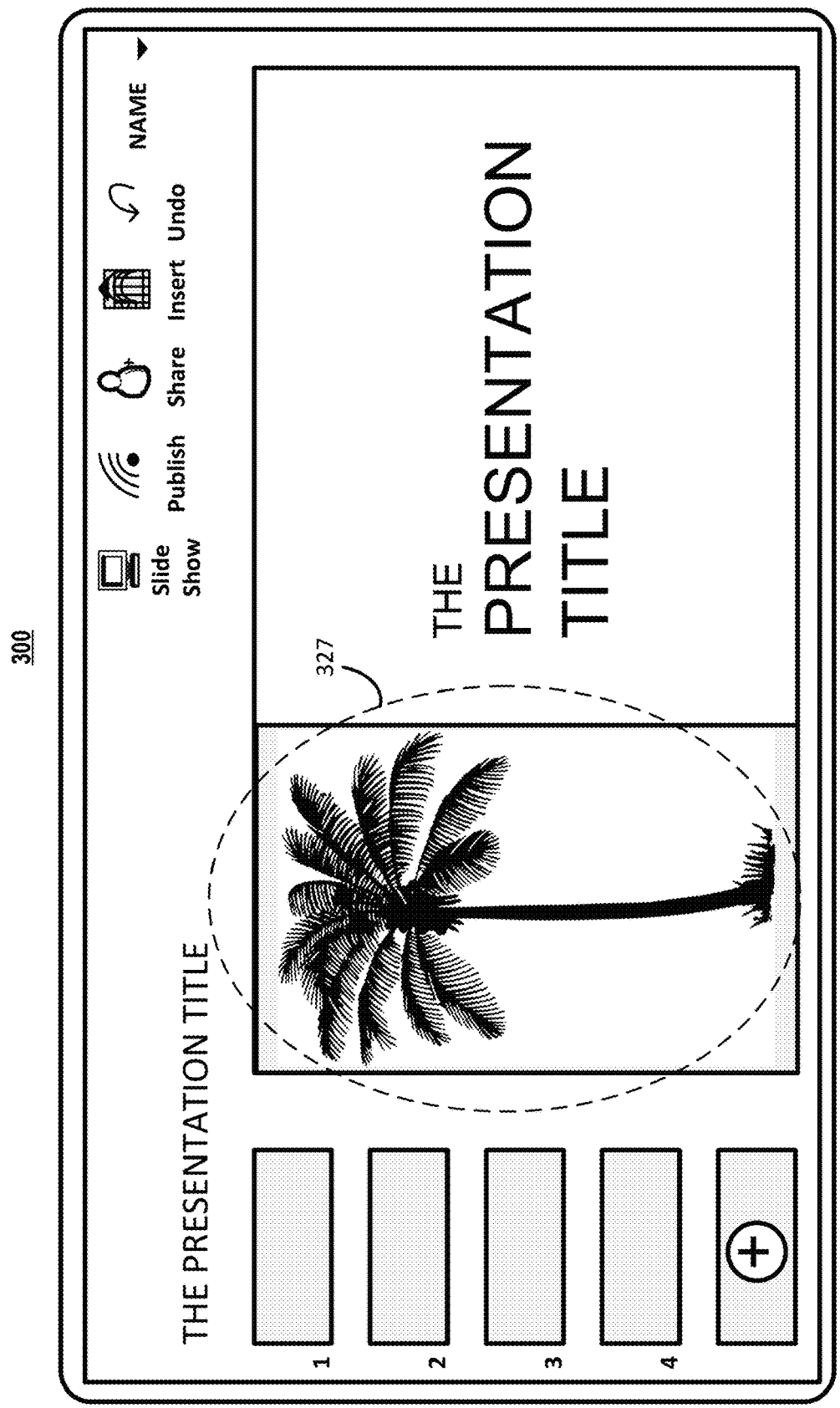

Referring to FIG. 3F, a determination of the user's intent (based on manipulation of the image 316) may be carried out at this stage and regions of the electronic document can be activated by assigning sets of commands that can be executed upon direct manipulation. The activated regions can be identified to the user by displaying indicators (e.g., 317, 318, 319, 320, 321, 322, 323, 324) that correspond to different activation regions defined and located within electronic document 302. Indicators visually inform the user of the locations of activation regions, which are invisible to the user. For instance, activation regions can be implemented as transparent overlays within electronic document. An activation region can be implemented as a snappable area along the border of electronic document so that dragging and/or dropping selected image into a snappable area causes functionality of an activation region to be executed.

In this example embodiment, different activation regions are located within the electronic document at: the upper right corner (shown by indicator 319), the right edge (shown by indicator 320), the lower right corner (shown by indicator 321), the upper left corner (shown by indicator 317), the left edge (shown by indicator 324), the lower left corner (shown by indicator 323), the top edge (shown by indicator 318), and the bottom edge (shown by indicator 322). The indicators for the different activation regions may show a visual representation 325 that graphically represents the end results of executing the command sets associated with the activation region.

Each different activation region is associated with a different command set, and each different command set can be executed to perform a different multi-step operation to modify a current content layout of electronic document in a different way. Each different command set can include a subset or combination of commands selected from: an image positioning command, an image resizing command, an image formatting command, a text wrapping command, a text formatting command, and a section layout command. Each different command set can include a subset or combination of commands provided by a ribbon (e.g., tabbed set of toolbars) of the slideshow presentation application that provides application user interface. In this example, the ribbon of the slideshow presentation application is hidden and can be selectively displayed by the user. The different command sets provide the user with multiple content layouts when the user interacts with electronic document by directly manipulating content within the electronic document and interacting with activation regions within electronic document.

In FIG. 3G, selected image 316 is moved within electronic document in response the user dragging (326) selected image to the left. Selected image 316 is moved to the left and over the indicator for the activation region 324 at the left edge of electronic document. In some cases, a preview can be displayed in an overlay while the user is holding the selected image within the activation region 324. In other cases, such as where the activation region indicator shows a thumbnail preview (e.g., visual representation 325), an additional preview may not be provided.

The command set associated with the activation region 324 can be executed if the selected image 316 is released while within the activation region 324. Accordingly, when the selected image is dropped at a position within the activation region at the left edge of electronic document, the command set associated with the activation region at the left edge of electronic document is executed to provide a command set result 327 such as shown in FIG. 3H. In this case, execution of the command set provides a command set result 327 of a multi-step operation of: positioning selected image in the left section of electronic document, resizing selected image to fill the left section of electronic document, and adjusting the color of the presentation title.

Example Process for Providing Direct Manipulation, Multi-Step Operation Functionality With continuing reference to the foregoing figures, an example process is described below to further illustrate aspects of the described subject matter. It is to be understood that the following example process is not intended to limit the described subject matter to particular implementations.

Figure 4A:
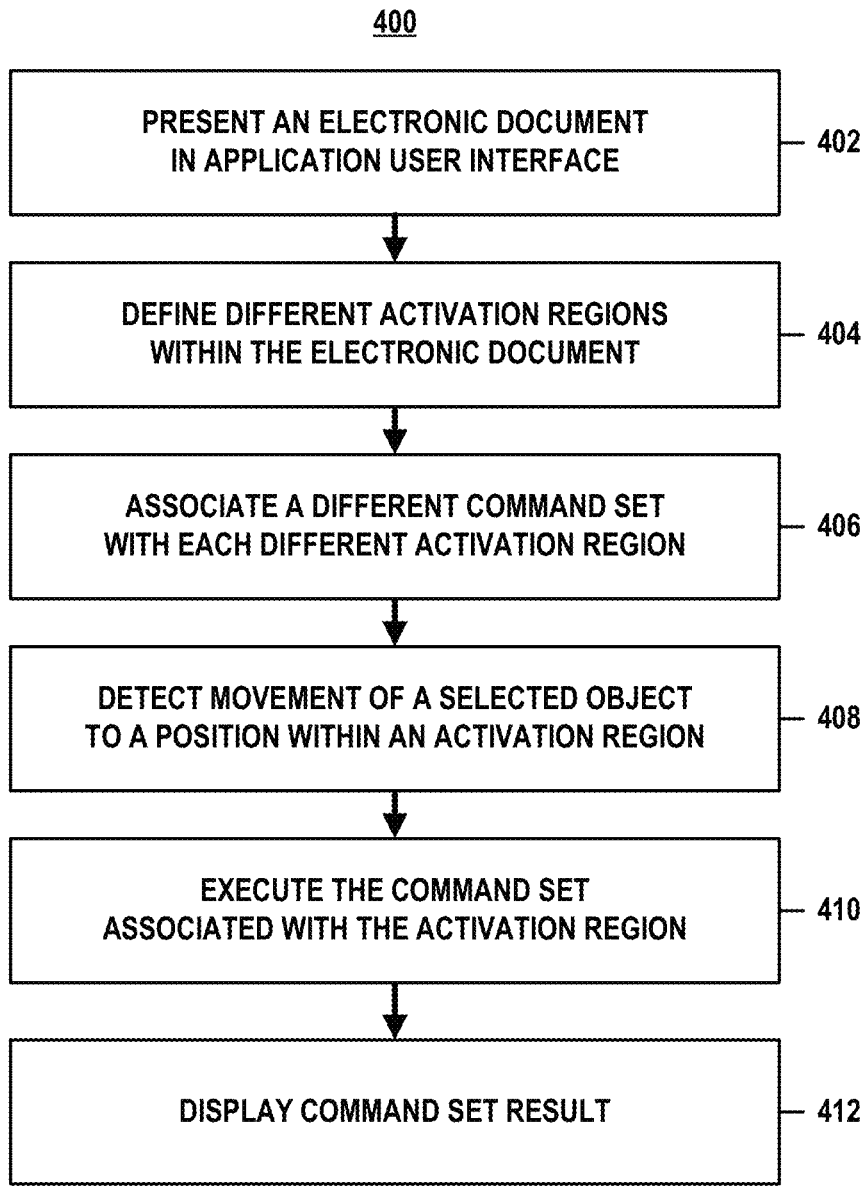
FIGS. 4A and 4B illustrate example processes for effecting multi-step operations in an application in response to direct manipulation of a selected object in accordance with aspects of the described subject matter.
Figure 4B:
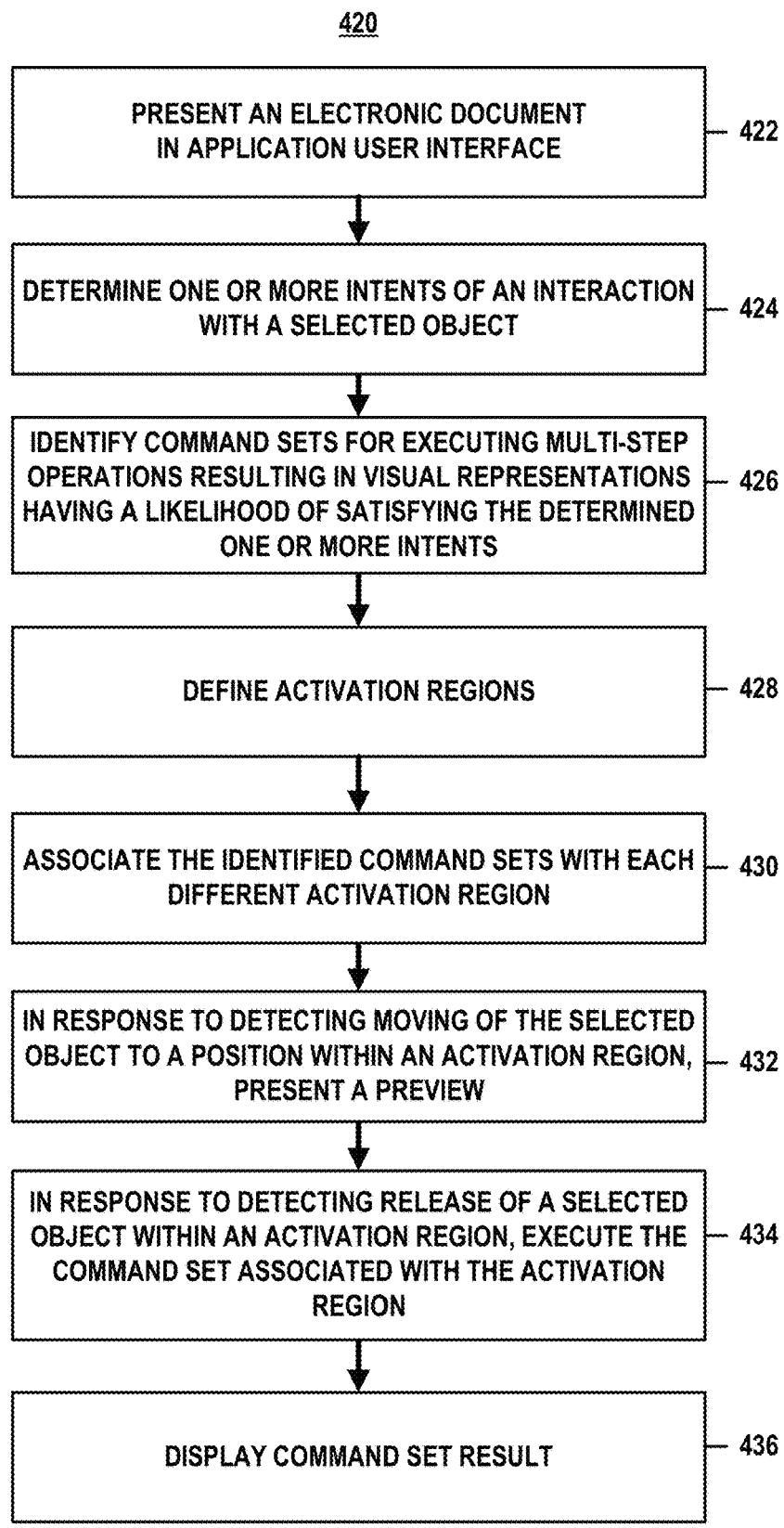

FIGS. 4A and 4B illustrate example processes for effecting multi-step operations in an application in response to direct manipulation of a selected object in accordance with aspects of the described subject matter. In various embodiments, computer-implemented methods 400 and 420 can be performed by a computing device and/or a computer system including one or more computing devices. It is to be appreciated that computer-implemented methods 400 and 420, or portions thereof, can be performed by various computing devices, computer systems, components, and/or computer-executable instructions stored on one more computer-readable storage media.

Turning first to an implementation illustrated by method 400, at 402, a computing device can present an electronic document within an application user interface. The application user interface can be implemented by various applications including, but not limited to: word processing applications, spreadsheet applications, slideshow presentation applications, note taking applications, email applications, text messaging applications, and other types of applications that enable users to select, author, and/or edit content. The electronic document has a current page layout.

At 404, the computing device can define different activation regions with the electronic document. The different activation regions can be located along different portions of a border of the electronic document. When the electronic document has a multi-column format, the different activation regions can be located along different edges of a column. The different activation regions can be invisible to the user and can be implemented as snappable regions. The activation regions may be pre-defined, may be defined based on a current interaction a user may have with content in the document, or have a combination of both.

At 406, the computing device can associate a different command set with each different activation region. Each different activation region can be associated with a different command set, where each different command set can be executed to perform a different multi-step operation. Each different multi-step operation can modify the current content layout of electronic document in a different way. A command set associated with an activation region can include a plurality of: an object positioning command, an object resizing command, an object formatting command, a text positioning command, a text formatting command, a column layout command, a section layout command, and the like. Different command sets can include different subsets or combinations of commands.

Operations 404 and 406 can include various intent-based analysis.

At 408, the computing device can detect movement of a selected object to a position within an activation region. Activation region indicators and/or alignment lines can be displayed upon selection of object and/or during movement of the selected object prior to positioning with the activation region. Activation region indicators can be icons that graphically represent end results of executing the command sets associated with the activation regions. A vertical alignment line that abuts selected image can change colors to indicate when selected object is in an acceptable position for placement. The manipulation of the selected object can then be used to initiate execution of a multi-step operation.

For example, at 410, the computing device can execute the command set associated with the activation region based on determining that the selected object has been released within the activation region. Execution of the command set associated with the activation region can perform a multi-step operation that modifies the current layout of the electronic document. Modifying the current layout of the electronic document can involve, for example, repositioning and/or resizing the selected object and text within the electronic document.

At 412, the computing device can display a command set result. The command set result can be displayed within the electronic document in response to placement of the selected object in the activation region. The command set result can be the result of a multi-step operation that changes the current layout of content in electronic document. The command set result can replace command set preview when the selected object is dropped in the activation region.

Similar to the implementation illustrated by method 400, the implementation illustrated by method 420, at 422, a computing device can present an electronic document within an application user interface. The application user interface can be implemented by various applications including, but not limited to: word processing applications, spreadsheet applications, slideshow presentation applications, note taking applications, email applications, text messaging applications, and other types of applications that enable users to select, author, and/or edit content.

At 424, the computing device can determine one or more intents of an interaction a user may have with a selected object.

At 426, based on the determined intents, the computing device can identify command sets that would result in visual representations having a likelihood of satisfying the determined one or more intents (e.g., are relevant command sets). The command sets can include a set of commands that affect layout, style, and/or format. The style and format commands included in a command set for a multi-step operation can be for different types of objects such as text objects and image objects. The command sets can include a set of commands to perform a multi-step operation that affects both format and style of an image object. The command sets can include a set of commands to perform a multi-step operation that affects both format and style of a text object. The command sets can include a set of commands to perform a multi-step operation that affects format and style of both an image object and a text object.

At 428, the computing device can define regions of the electronic document to be used as activation regions. These regions may be near the current position of the selected object and/or located at different parts of the border of the displayed portion of the electronic document.

At 430, the relevant command sets can be associated with activation regions. Activation region indicators can be displayed on the electronic document. The activation region indicators can provide a visual marker for the user to interact with via manipulation of the selected object.

At 432, the computing device can display a command set preview. The command set preview can be displayed in response to the user dragging the selected object to a position within the activation region without dropping or placing the selected object in the activation region. The command set preview can be implemented as a faded graphical representation that provides the user with a preview of the result of a command set associated with an activation region.

At 434, the computing device can execute the command set associated with the activation region in response to detecting release of the selected object within an activation region.

At 436, the computing device can display a command set result of executing the command set.

Example Operating Environments

Aspects of the described subject matter can be implemented for and/or by various operating environments, computer networks, platforms, frameworks, computer architectures, and/or computing devices. Aspects of the described subject matter can be implemented by computer-executable instructions that can be executed by one or more computing devices, computer systems, and/or processors.

In its most basic configuration, a computing device and/or computer system can include at least one processing unit (e.g., single-processor units, multi-processor units, single-core units, and/or multi-core units) and memory. Depending on the exact configuration and type of computer system or computing device, the memory implemented by a computing device and/or computer system can be volatile (e.g., random access memory (RAM)), non-volatile (e.g., read-only memory (ROM), flash memory, and the like), or a combination thereof.

A computing device and/or computer system can have additional features and/or functionality. For example, a computing device and/or computer system can include hardware such as additional storage (e.g., removable and/or non-removable) including, but not limited to: solid state, magnetic, optical disk, or tape.

A computing device and/or computer system typically can include or can access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) can be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter can be implemented by computer-executable instructions stored on one or more computer-readable storage media. Computer-executable instructions can be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

A computing device and/or computer system can include various input devices, output devices, communication interfaces, and/or other types of devices. Example input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device can provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device can be configured to receive and respond to input in various ways depending upon implementation. Responses can be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Example output devices include, without limitation: a display, a projector, a speaker, a printer, and/or other type of output mechanism and/or device.

A computing device and/or computer system can include one or more communication interfaces that allow communication between and among other computing devices and/or computer systems. Communication interfaces can be used in the context of network communication between and among various computing devices and/or computer systems. Communication interfaces can allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces can be used in the context of accessing, obtaining data from, and/or cooperating with various types of resources.

Communication interfaces also can be used in the context of distributing computer-executable instructions over a network or combination of networks. For example, computer-executable instructions can be combined or distributed utilizing remote computers and storage devices. A local or terminal computer can access a remote computer or remote storage device and download a computer program or one or more parts of the computer program for execution. It also can be appreciated that the execution of computer-executable instructions can be distributed by executing some instructions at a local terminal and executing some instructions at a remote computer.

A computing device can be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device can be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also can be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device can include and/or run one or more computer programs implemented, for example, by software, firmware, hardware, logic, and/or circuitry of the computing device. Computer programs can be distributed to and/or installed on a computing device in various ways. For instance, computer programs can be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device can include one or more operating systems. Example operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device can include one or more client applications. Example client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device can include one or more server applications. Example server applications include, without limitation: one or more server-hosted, cloud-based, and/or online applications associated with any of the various types of example client applications described above; one or more server-hosted, cloud-based, and/or online versions of any of the various types of example client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system can be implemented by a computing device, such as a server computer, or by multiple computing devices configured to implement a service in which one or more suitably-configured computing devices can perform one or more processing steps. A computer system can be implemented as a distributed computing system in which components are located on different computing devices that are connected to each other through network (e.g., wired and/or wireless) and/or other forms of direct and/or indirect connections. A computer system also can be implemented via a cloud-based architecture (e.g., public, private, or a combination thereof) in which services are delivered through shared datacenters. Some components of a computer system can be disposed within a cloud while other components are disposed outside of the cloud.

Figure 5:
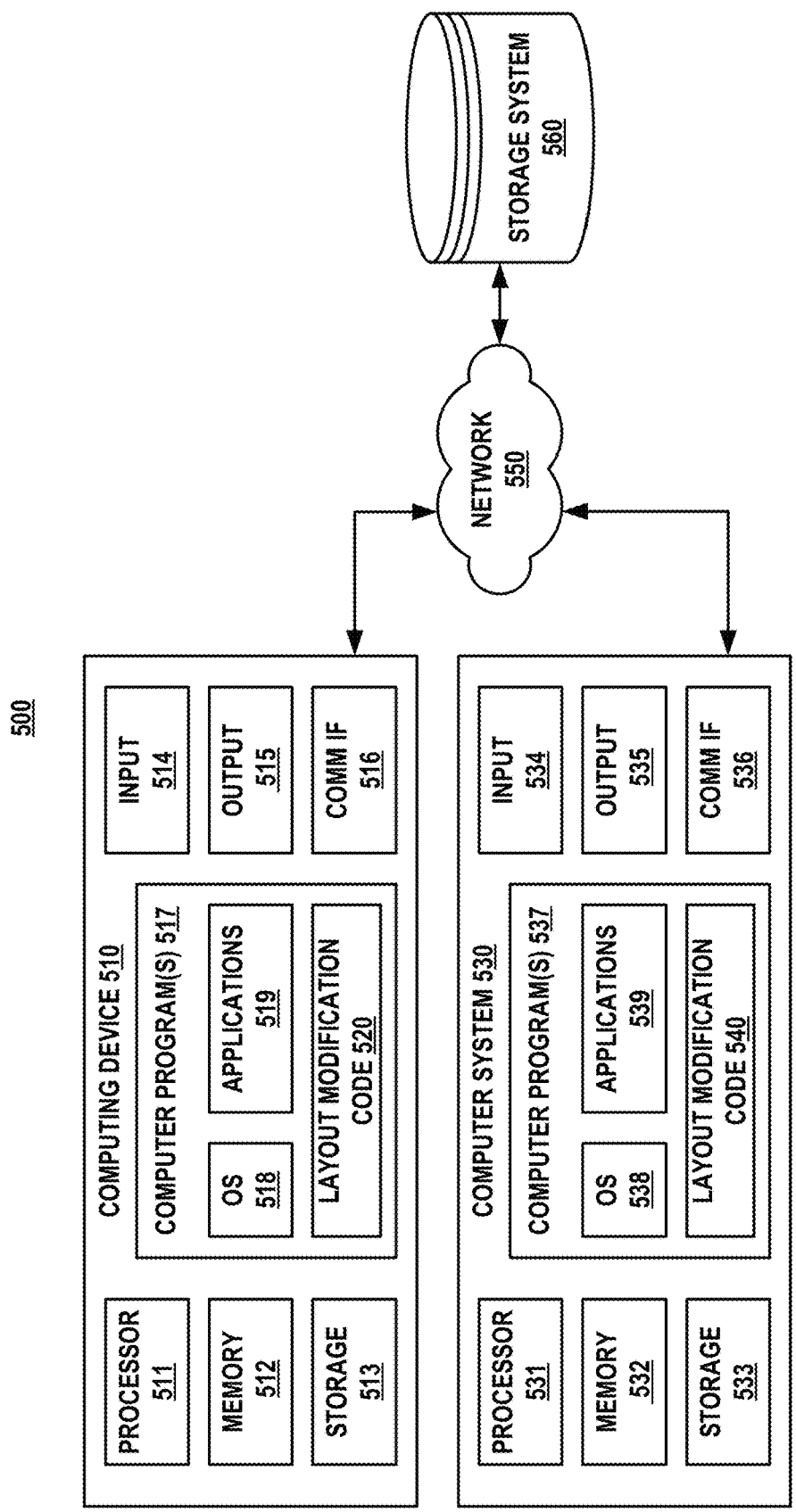
FIG. 5 illustrates an embodiment of an example operating environment that can implement aspects of the described subject matter.

FIG. 5 illustrates an operating environment 500 as an embodiment of an example operating environment that can implement aspects of the described subject matter. It is to be appreciated that operating environment 500 can be implemented by a client-server model and/or architecture as well as by other operating environment models and/or architectures in various embodiments.

Operating environment 500 can include a computing device 510, which can implement aspects of the described subject matter. Computing device 510 can include a processor 511 and memory 512. Computing device 510 also can include additional hardware storage 513. Computer-readable storage media can include memory 512 and hardware storage 513.

Computing device 510 can include input devices 514 and output devices 515. Input devices 514 can include one or more of the example input devices described above and/or other type of input mechanism and/or device. Output devices 515 can include one or more of the example output devices described above and/or other type of output mechanism and/or device.

Computing device 510 can contain one or more communication interfaces 516 that allow computing device 510 to communicate with other computing devices and/or computer systems. Communication interfaces 516 also can be used in the context of distributing computer-executable instructions.

Computing device 510 can include and/or run one or more computer programs 517 implemented, for example, by software, firmware, hardware, logic, and/or circuitry of computing device 510. Computer programs 517 can include an operating system 518 implemented, for example, by one or more example operating systems described above and/or other type of operating system suitable for running on computing device 510. Computer programs 517 can include one or more applications 519 implemented, for example, by one or more example applications described above and/or other type of application suitable for running on computing device 510.

Computer programs 517 can be configured via one or more suitable interfaces (e.g., API or other data connection) to communicate and/or cooperate with one or more resources. Examples of resources include local computing resources of computing device 510 and/or remote computing resources such as server-hosted resources, cloud-based resources, online resources, remote data stores, remote databases, remote repositories, web services, web sites, web pages, web content, and/or other types of remote resources.

Computer programs 517 can implement computer-executable instructions that are stored in computer-readable storage media such as memory 512 or hardware storage 513, for example. Computer-executable instructions implemented by computer programs 517 can be configured to work in conjunction with, support, and/or enhance one or more of operating system 518 and applications 519. Computer-executable instructions implemented by computer programs 517 also can be configured to provide one or more separate and/or stand-alone services.

Computing device 510 and/or computer programs 517 can implement and/or perform various aspects of the described subject matter. As shown, computing device 510 and/or computer programs 517 can include layout modification code 520. In various embodiments, layout modification code 520 can include computer-executable instructions that are stored on a computer-readable storage medium and configured to implement one or more aspects of the described subject matter. By way of example, and without limitation, layout modification code 520 can be implemented by program modules of user experience framework 100.

Operating environment 500 can include a computer system 530, which can implement aspects of the described subject matter. Computer system 530 can be implemented by one or more computing devices such as one or more server computers. Computer system 530 can include a processor 531 and memory 532. Computer system 530 also can include additional hardware storage 533. Computer-readable storage media can include memory 532 and hardware storage 533. Computer system 530 can include input devices 534 and output devices 535. Input devices 534 can include one or more of the example input devices described above and/or other type of input mechanism and/or device. Output devices 535 can include one or more of the example output devices described above and/or other type of output mechanism and/or device.

Computer system 530 can contain one or more communication interfaces 536 that allow computer system 530 to communicate with various computing devices (e.g., computing device 510) and/or other computer systems. Communication interfaces 536 also can be used in the context of distributing computer-executable instructions.

Computer system 530 can include and/or run one or more computer programs 537 implemented, for example, by software, firmware, hardware, logic, and/or circuitry of computer system 530. Computer programs 537 can include an operating system 538 implemented, for example, by one or more example operating systems described above and/or other type of operating system suitable for running on computer system 530. Computer programs 537 can include one or more applications 539 implemented, for example, by one or more example applications described above and/or other type of application suitable for running on computer system 530.

Computer programs 537 can be configured via one or more suitable interfaces (e.g., API or other data connection) to communicate and/or cooperate with one or more resources. Examples of resources include local computing resources of computer system 530 and/or remote computing resources such as server-hosted resources, cloud-based resources, online resources, remote data stores, remote databases, remote repositories, web services, web sites, web pages, web content, and/or other types of remote resources.

Computer programs 537 can implement computer-executable instructions that are stored in computer-readable storage media such as memory 532 or hardware storage 533, for example. Computer-executable instructions implemented by computer programs 537 can be configured to work in conjunction with, support, and/or enhance one or more of operating system 538 and applications 539. Computer-executable instructions implemented by computer programs 537 also can be configured to provide one or more separate and/or stand-alone services.

Computing system 530 and/or computer programs 537 can implement and/or perform various aspects of the described subject matter. As shown, computer system 530 and/or computer programs 537 can include layout modification code 540. In various embodiments, layout modification code 440 can include computer-executable instructions that are stored on a computer-readable storage medium and configured to implement one or more aspects of the described subject matter. By way of example, and without limitation, layout modification code 540 can be implemented by program modules of user experience framework 100.

Computing device 510 and computer system 530 can communicate over network 550, which can be implemented by any type of network or combination of networks suitable for providing communication between computing device 510 and computer system 530. Network 550 can include, for example and without limitation: a WAN such as the Internet, a LAN, a telephone network, a private network, a public network, a packet network, a circuit-switched network, a wired network, and/or a wireless network. Computing device 510 and computer system 530 can communicate over network 550 using various communication protocols and/or data types. One or more communication interfaces 516 of computing device 510 and one or more communication interfaces 536 of computer system 530 can by employed in the context of communicating over network 550.

Computing device 510 and/or computer system 530 can communicate with a storage system 560 over network 550. Alternatively, or additionally, storage system 560 can be integrated with computing device 510 and/or computer system 530. Storage system 560 can be representative of various types of storage in accordance with the described subject matter. Storage system 560 can provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 560 can be implemented by one or more computing devices, such as a computer cluster in a datacenter, by virtual machines, and/or provided as a cloud-based storage service.

Figure 6:
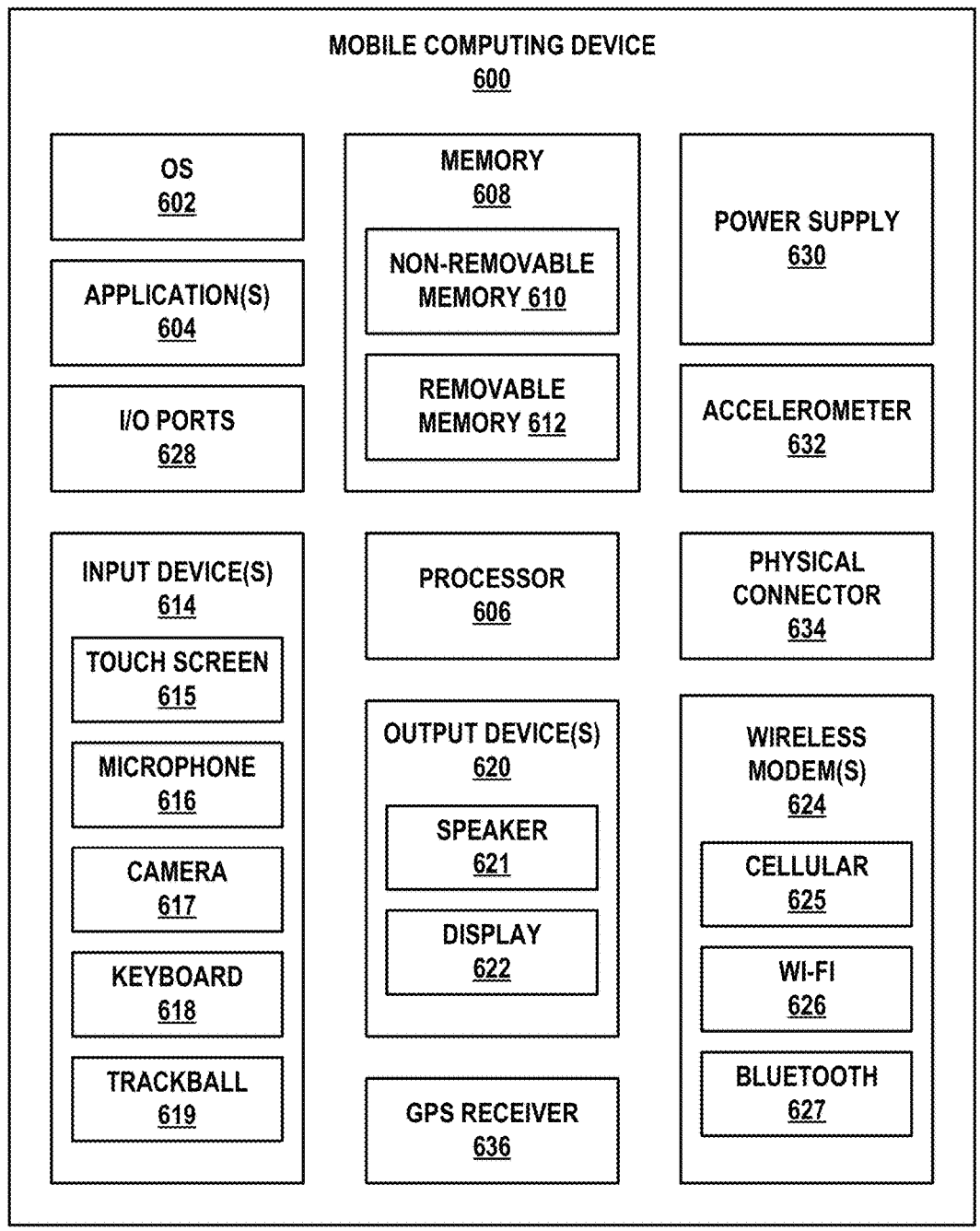
FIG. 6 illustrates an embodiment of an example mobile computing device that can implement aspects of the described subject matter.

FIG. 6 illustrates a mobile computing device 600 as an embodiment of an example mobile computing device that can implement aspects of the described subject matter. In various implementations, mobile computing device 600 can be an example of one or more of: client devices 102-104, touchscreen computing device 200, touchscreen computing device 300, and/or computing device 510.

As shown, mobile computing device 600 includes a variety of hardware and software components that can communicate with each other. Mobile computing device 600 can represent any of the various types of mobile computing device described herein and can allow wireless two-way communication over a network, such as one or more mobile communications networks (e.g., cellular and/or satellite network), a LAN, and/or a WAN.

Mobile computing device 600 can include an operating system 602 and various types of mobile application(s) 604. In some implementations, mobile application(s) 604 can include one or more client application(s) and/or components of layout modification code 520.

Mobile computing device 600 can include a processor 606 (e.g., signal processor, microprocessor, ASIC, or other control and processing logic circuitry) for performing tasks such as: signal coding, data processing, input/output processing, power control, and/or other functions.

Mobile computing device 600 can include memory 608 implemented as non-removable memory 610 and/or removable memory 612. Non-removable memory 610 can include RAM, ROM, flash memory, a hard disk, or other memory device. Removable memory 612 can include flash memory, a Subscriber Identity Module (SIM) card, a "smart card" and/or other memory device.

Memory 608 can be used for storing data and/or code for running operating system 602 and/or mobile application(s) 604. Example data can include web pages, text, images, sound files, video data, or other data to be sent to and/or received from one or more network servers or other devices via one or more wired and/or wireless networks. Memory 608 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile computing device 600 can include and/or support one or more input device(s) 614, such as a touch screen 615, a microphone 616, a camera 617, a keyboard 618, a trackball 619, and other types of input devices (e.g., NUI device and the like). Touch screen 615 can be implemented, for example, using a capacitive touch screen and/or optical sensors to detect touch input. Mobile computing device 600 can include and/or support one or more output device(s) 620, such as a speaker 621, a display 622, and/or other types of output devices (e.g., piezoelectric or other haptic output devices). In some implementations, touch screen 615 and display 622 can be combined in a single input/output device.

Mobile computing device 600 can include wireless modem(s) 624 that can be coupled to antenna(s) (not shown) and can support two-way communications between processor 906 and external devices. Wireless modem(s) 624 can include a cellular modem 625 for communicating with a mobile communication network and/or other radio-based modems such as Wi-Fi modem 626 and/or Bluetooth modem 627. Typically, at least one of wireless modem(s) 624 is configured for: communication with one or more cellular networks, such as a GSM network for data and voice communications within a single cellular network; communication between cellular networks; or communication between mobile computing device 600 and a public switched telephone network (PSTN).

Mobile computing device 600 can further include at least one input/output port 628, a power supply 630, an accelerometer 632, a physical connector 634 (e.g., a USB port, IEEE 1394 (FireWire) port, RS-232 port, and the like), and/or a Global Positioning System (GPS) receiver 636 or other type of a satellite navigation system receiver. It can be appreciated the illustrated components of mobile computing device 600 are not required or all-inclusive, as various components can be omitted and other components can be included in various embodiments.

In various implementations, components of mobile computing device 600 can be configured to perform various operations in connection with aspects of the described subject matter. By way of example, and without limitation, mobile computing device 600 can implement program modules of user experience framework 100. Computer-executable instructions for performing operations in accordance with the described subject matter can be stored in a computer-readable storage medium, such as memory 608 for instance, and can be executed by processor 606.

Figure 7:
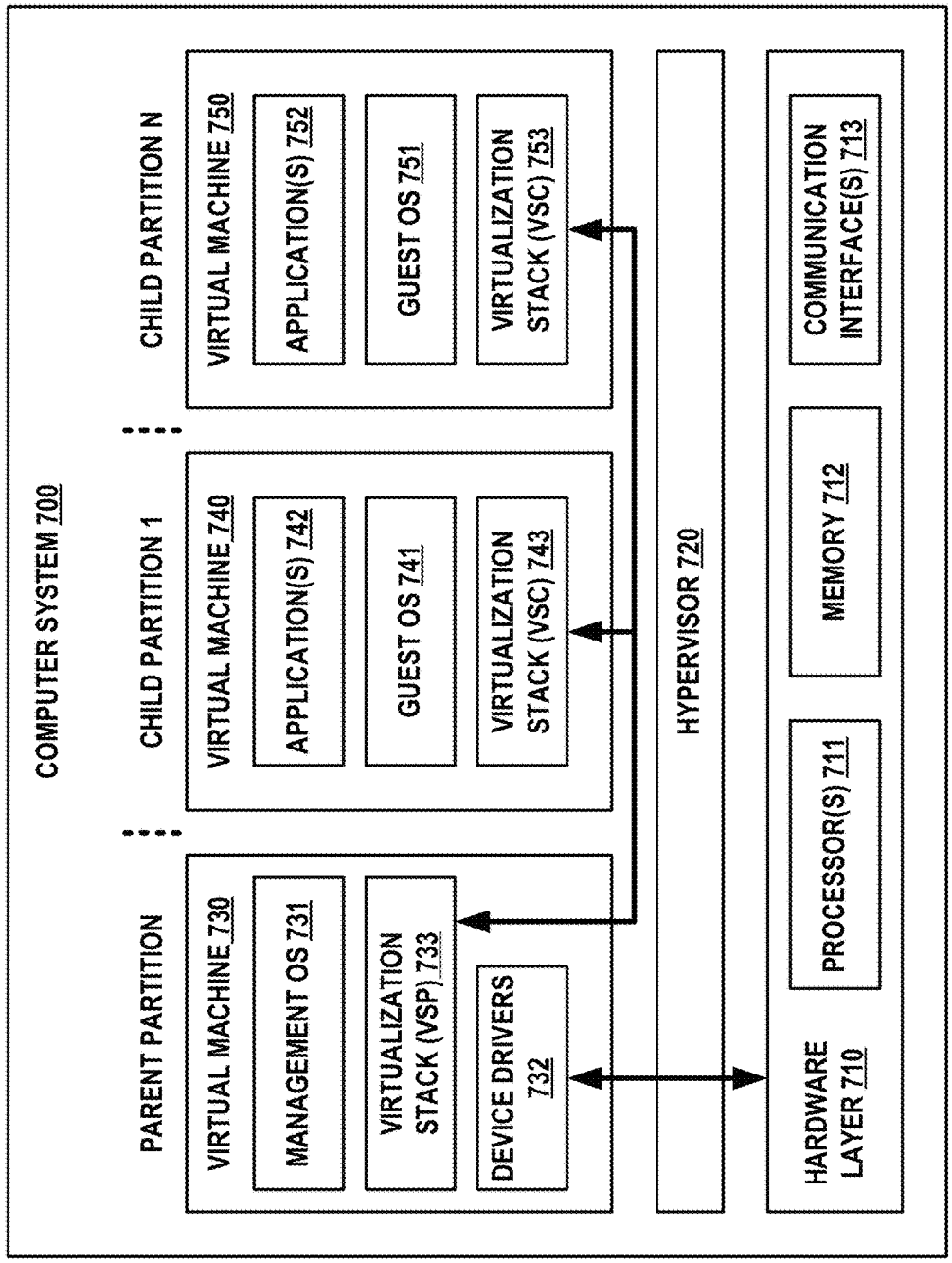
FIG. 7 illustrates an embodiment of an example computer system that can implement aspects of the described subject matter.

FIG. 7 illustrates a computer system 700 as an embodiment of an example computer system that can implement aspects of the described subject matter. In various implementations, deployment of computer system 700 and/or multiple deployments thereof can provide server virtualization for concurrently running multiple virtual servers instances on one physical host server computer and/or network virtualization for concurrently running multiple virtual network infrastructures on the same physical network.

Computer system 700 can be implemented by various computing devices such as one or more physical server computers that provide a hardware layer 710 which can include processor(s) 711, memory 712, and communication interface(s) 713. Computer system 700 can implement a hypervisor 720 configured to manage, control, and/or arbitrate access to hardware layer 710. In various implementations, hypervisor 720 can manage hardware resources to provide isolated execution environments or partitions such a parent (root) partition and one or more child partitions. A parent partition can operate to create one or more child partitions. Each partition can be implemented as an abstract container or logical unit for isolating processor and memory resources managed by hypervisor 720 and can be allocated a set of hardware resources and virtual resources. A logical system can map to a partition, and logical devices can map to virtual devices within the partition.

Parent and child partitions can implement virtual machines such as virtual machines 730, 740, and 750, for example. Each virtual machine can emulate a physical computing device or computer system as a software implementation that executes programs like a physical machine. Each virtual machine can have one or more virtual processors and can provide a virtual system platform for executing an operating system (e.g., a Microsoft® operating system, a Google® operating system, an operating system from Apple®, a Linux® operating system, an open source operating system, etc.). As shown, virtual machine 730 in parent partition can run a management operating system 731, and virtual machines 740, 750 in child partitions can host guest operating systems 741, 751 each implemented, for example, as a full-featured operating system or a special-purpose kernel. Each of guest operating systems 741, 751 can schedule threads to execute on one or more virtual processors and effectuate instances of application(s) 742, 752, respectively.

Virtual machine 730 in parent partition can have access to hardware layer 710 via device drivers 732 and/or other suitable interfaces. Virtual machines 740, 750 in child partitions, however, generally do not have access to hardware layer 710. Rather, such virtual machines 740, 750 are presented with a virtual view of hardware resources and are supported by virtualization services provided by virtual machine 730 in parent partition. Virtual machine 730 in parent partition can host a virtualization stack 733 that provides virtualization management functionality including access to hardware layer 710 via device drivers 732. Virtualization stack 733 can implement and/or operate as a virtualization services provider (VSP) to handle requests from and provide various virtualization services to a virtualization service client (VSC) implemented by one or more virtualization stacks 743, 753 in virtual machines 740, 750 that are operating in child partitions.

Computer system 700 can implement and/or perform various aspects of the described subject matter. By way of example, and without limitation, one or more virtual machines 740, 750 can implement layout modification functionality. By way of further example, and without limitation, one or more virtual machines 740, 750 can implement program modules of user experience framework 100.

The detailed description provided above in connection with the appended drawings explicitly describes and supports various aspects in accordance with the described subject matter.

Supported aspects further include an apparatus, a system, a computer-readable storage medium, a computer-implemented method, and/or means for implementing any of the foregoing computing devices or portions thereof.

Supported aspects can provide various attendant and/or technical advantages in terms of improved efficiency and/or savings with respect to power consumption, memory, processor cycles, and/or other computationally-expensive resources.

The detailed description provided above in connection with the appended drawings is intended as a description of examples and is not intended to represent the only forms in which the present examples may be constructed or utilized.

It is to be understood that the configurations and/or approaches described herein are example in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computing device comprising:
   a processor configured to execute computer-executable instructions; and
   memory storing computer-executable instructions configured to:
   present an electronic document within a graphical user interface, the electronic document having a current page layout and content;
   detect an interaction with a selected object of the content of the electronic document presented in the graphical user interface;
   determine one or more intents of the interaction with the selected object according to context;
   use the determined one or more intents to identify command sets for executing multi-step operations resulting in visual representations having a likelihood of satisfying the determined one or more intents;
   define different activation regions within the electronic document, the different activation regions including different portions of a border of the electronic document;
   associate a different command set with each different activation region, wherein each different command set, when executed, performs a different multi-step operation;
   detect movement of the selected object within the electronic document to a position within an activation region within the electronic document; and
   execute the command set associated with the activation region to perform a multi-step operation that modifies at least the current page layout of the electronic document.

2. The computing device of claim 1, wherein the interaction with the selected object comprises an interaction that causes at least a portion of the selected object to overlap with other content presented within the graphical user interface.

3. The computing device of claim 1, wherein the instructions configured to associate the different command set with each different activation region further comprise instructions configured to at least:
   determine one or more intents of a subsequent interaction with the selected object according to context at time of the subsequent interaction;
   identify second command sets for executing multi-step operations resulting in visual representations having a likelihood of satisfying the determined one or more intents of the subsequent interaction; and associate the identified second command sets with each different activation region in place of the identified command sets, the identified second command sets being the different command sets.

4. The computing device of claim 1, wherein the memory further stores computer-executable instructions configured to:

in response to detecting movement of the selected object to the position within the activation region and without receiving an indication the selected object is released, present a preview of a layout corresponding to the multi-step operation provided by the command set associated with the activation region on which the selected object is detected within;

wherein the command set is executed to perform the multi-step operation only after detecting a release action while the selected object is detected within the activation region.

5. The computing device of claim 1, wherein at least one of the command sets comprises commands to perform a multi-step operation that affects both format and style of an image object.

6. The computing device of claim 1, wherein at least one of the command sets comprises commands to perform a multi-step operation that affects both format and style of a text object.

7. The computing device of claim 1, wherein at least one of the command sets comprises commands to perform a multi-step operation that affects format and style of both an image object and a text object.

8. A computer-implemented method of effecting multi-step operations in an application, comprising:

displaying a graphical user interface for an application;

presenting content of an electronic document in the graphical user interface;

detecting an interaction with a selected object of the content of the electronic document presented in the graphical user interface;

determining one or more intents of the interaction with the selected object according to context;

using the determined one or more intents to identify command sets for executing multi-step operations resulting in visual representations having a likelihood of satisfying the determined one or more intents;

defining regions of the electronic document to be used as activation regions;

associating the identified command sets with the activation regions; and in response to receiving an indication that the selected object is moved while within the electronic document and released while within one of the activation regions, executing the command set associated with that activation region.

9. The method of claim 8, further comprising:

in response to receiving an indication that the selected object is within one of the activation regions and without receiving an indication the selected object is released, displaying a preview of a result corresponding to the multi-step operation provided by the command set associated with the activation region on which the selected object is detected within.

10. The method of claim 9, wherein the preview overlays at least a portion of the electronic document.

11. The method of claim 8, further comprising:

presenting indicators on the electronic document that identify the activation regions after defining the regions of the electronic document to be used as activation regions.

12. The method of claim 11, wherein the indicators comprise thumbnail images of a result corresponding to the multi-step operation provided by the command set associated with the activation regions identified by the indicators.

13. The method of claim 8, wherein at least one of the command sets comprises commands to perform a multi-step operation that affects both format and style of an image object.

14. The method of claim 8, wherein at least one of the command sets comprises commands to perform a multi-step operation that affects both format and style of a text object.

15. The method of claim 8, wherein at least one of the command sets comprises commands to perform a multi-step operation that affects format and style of both an image object and a text object.

16. One or more computer-readable storage media having instructions stored thereon that, when executed by a processor, direct the processor to at least:

display a graphical user interface for an application;

present content of an electronic document in the graphical user interface;

detect an interaction with a selected object of the content of the electronic document presented in the graphical user interface while within the electronic document;

determine one or more intents of the interaction with the selected object according to context;

using the determined one or more intents, identify command sets for executing multi-step operations resulting in visual representations having a likelihood of satisfying the determined one or more intents;

define regions of the electronic document to be used as activation regions;

associate the identified command sets with the activation regions;

in response to receiving an indication that the selected object is within one of the activation regions and without receiving an indication the selected object is released, display a preview of a result corresponding to the multi-step operation provided by the command set associated with the activation region on which the selected object is detected within; and in response to receiving an indication that the selected object is released while within the activation region, execute the command set associated with that activation region.

17. The media of claim 16, wherein at least one of the command sets comprises commands to perform a multi-step operation that affects both format and style of an image object.

18. The media of claim 16, wherein at least one of the command sets comprises commands to perform a multi-step operation that affects both format and style of a text object.

19. The media of claim 16, wherein at least one of the command sets comprises commands to perform a multi-step operation that affects format and style of both an image object and a text object.

20. The computing device of claim 1, wherein the context comprises one or more of application state, operation history, command history, and relationship between the selected object and other content of the electronic document.

* * * * *